US009380009B2

(12) United States Patent
Ravi et al.

(10) Patent No.: US 9,380,009 B2
(45) Date of Patent: Jun. 28, 2016

(54) RESPONSE COMPLETION IN SOCIAL MEDIA

(75) Inventors: Sujith Ravi, Santa Clara, CA (US); Bo Pang, Sunnyvale, CA (US)

(73) Assignee: Yahoo! Inc., Sunnyvale, CA (US)

( * ) Notice: Subject to any disclaimer, the term of this patent is extended or adjusted under 35 U.S.C. 154(b) by 281 days.

(21) Appl. No.: 13/547,930

(22) Filed: Jul. 12, 2012

(65) Prior Publication Data

US 2014/0019117 A1  Jan. 16, 2014

(51) Int. Cl.
G06F 17/27 (2006.01)
H04L 12/58 (2006.01)
G06F 17/28 (2006.01)

(52) U.S. Cl.
CPC .............. *H04L 51/02* (2013.01); *G06F 17/276* (2013.01); *G06F 17/28* (2013.01); *H04L 51/04* (2013.01)

(58) Field of Classification Search
CPC .......... H04L 51/02; H04L 51/04; G06F 17/28
USPC ...................................... 704/9; 709/206, 204
See application file for complete search history.

(56) References Cited

U.S. PATENT DOCUMENTS

| | | | |
|---|---|---|---|
| 6,104,989 A * | 8/2000 | Kanevsky et al. ................ 704/9 |
| 7,334,021 B1 * | 2/2008 | Fletcher ............... G06Q 10/107 709/206 |
| 7,360,151 B1 * | 4/2008 | Froloff .......................... 715/255 |
| 7,657,423 B1 * | 2/2010 | Harik et al. ....................... 704/9 |
| 7,680,948 B2 * | 3/2010 | McLennan et al. ........... 709/232 |
| 8,078,978 B2 * | 12/2011 | Perry et al. .................... 715/752 |
| 8,204,988 B2 * | 6/2012 | Lin et al. ....................... 709/224 |
| 8,364,467 B1 * | 1/2013 | Bowman .............. G06F 17/2765 704/1 |
| 8,478,826 B2 * | 7/2013 | Erhart et al. ................... 709/206 |
| 8,688,788 B2 * | 4/2014 | Wilson .......................... 709/206 |
| 8,706,827 B1 * | 4/2014 | Noble et al. .................. 709/206 |
| 2005/0080643 A1 * | 4/2005 | McLennan et al. ............... 705/1 |
| 2006/0206313 A1 * | 9/2006 | Xu et al. ......................... 704/10 |
| 2008/0003984 A1 * | 1/2008 | Kraft et al. ................. 455/412.1 |
| 2008/0072143 A1 * | 3/2008 | Assadollahi .......... G06F 3/0236 715/261 |

(Continued)

OTHER PUBLICATIONS

Blei, et al, "Latent Dirichlet Allocation," Journal of Machine Learning Research, vol. 3, 2003, pp. 993-1022.

(Continued)

*Primary Examiner* — Shaun Roberts
(74) *Attorney, Agent, or Firm* — Berkeley Law & Technology Group, LLP

(57) ABSTRACT

Embodiments are directed towards providing word-by-word message completion for an incomplete response message, wherein the response message is composed in response to a received stimulus message. The message completion is based on a Response Completion Model (RCM) that may model both the language used in the incomplete response message and the contextual information in the received stimulus message. The RCM may be determined based on conversational stimulus-response data including stimulus-response message pairs. The RCM may be a mixture model and include a generic response language model based on an N-gram model, a Stimulus Model based on a Selection Model or a Topic. Model, and a mixture parameter. In some embodiments, at least one candidate next word for the incomplete response message is determined based on the RCM. The at least one candidate next word may be selected and included in the incomplete response message. A complete response message may be generated and provided to a user.

27 Claims, 10 Drawing Sheets

(56) References Cited

U.S. PATENT DOCUMENTS

| | | | |
|---|---|---|---|
| 2011/0006929 A1* | 1/2011 | Fux | G06F 3/018 |
| | | | 341/24 |
| 2011/0197128 A1* | 8/2011 | Assadollahi | G06F 3/0237 |
| | | | 715/259 |
| 2011/0305325 A1* | 12/2011 | Visser | 379/88.01 |
| 2012/0011208 A1* | 1/2012 | Erhart et al. | 709/206 |
| 2012/0029910 A1* | 2/2012 | Medlock et al. | 704/9 |
| 2012/0198005 A1* | 8/2012 | DeLuca | 709/206 |
| 2012/0253801 A1* | 10/2012 | Santos-Lang | G10L 15/22 |
| | | | 704/235 |

OTHER PUBLICATIONS

Brown, et al, "An Estimate of an Upper Bound for the Entropy of English," Computational Linguistics, vol. 18, No. 1, 1992, pp. 31-40.

Cover, et al, "A Convergant Gambling Estimate of the Entropy of English," IEEE, Transactions on Information Theory, vol. 24, No. 4, Jul. 1978. pp. 413-421.

Farmer, et al, "The Collapse of the Indus-Script Thesis: The Myth of a Literate Harappan Civilization," Electronic Journal of Vedic Studies, vol. 11, 2004, pp. 19-57.

How, et al, "Optimizing predictive text for short message service on mobile phones," In Proceedings of the Human Computer Interfaces International (HCII), 2006, pp. 1-10.

James, et al, "Text Input for Mobile Devices: Comparing Model Prediction to Actual Performance," In Proceedings of the SIGCHI Conference on Human Factors in Computing Systems, CHI '01, New York, NY, USA, ACM, pp. 365-371, 2001.

Mackenzie, et al, "Text Entry for Mobile Computing: Models and Methods, Theory and Practice," Human-Computer Interaction, vol. 17, 2002, pp. 147-198.

Mei, et al, "Enropy of Search Logs: How Hard is Search? With Personalization? With Backoff?," In Proceedings of the International Conference on Web Search and Web Data Mining, WSDM '08, 2008, pp. 1-10.

Moradi, et al, "Entropy of English text: Experiments with humans and a machine learning system based on rough sets," Information Sciences, vol. 104, 1998, pp. 31-47 (1-30).

Nurmi, et al, "Predictive Text Input in a Mobile Shopping Assistant: Methods and Interface Design," In Proceedings of the 14th International Conference on Intelligent User Interfaces, IUI '09, Feb. 8-11, 2009, New York, NY, USA, ACM, pp. 1-4.

Rao, et al, "Entropic Evidence for Linguistic Structure in the Indus Script," www.sciencemag.org, Science, vol. 324, May 29, 2009, pp. 1-15.

Ritter, et al, "Data-Driven Response Generation in Social Media," In Proceedings of the Conference on Empirical Methods in Natural Language Processing, 2011, pp. 1-11.

Schneider, "Information Content of Individual Genetic Sequences," Journal of Theoretical Biology, vol. 189, No. 4, 1997, pp. 427-441 (1-25).

Shannon, "Prediction and Entropy of Printed English," Bell System Technical Journal, vol. 27, 1948, IEEE Computer Society Press, pp. 50-64.

Teahan, et al, "The entropy of English using PPM-based models," In Data Compression Confernce, 1998, IEEE Computer Society Press, pp. 53-62.

Weizenbaum, "Eliza: A Computer Program for the Study of Natural Language Communication Between Man and Machine," Communications of the ACM, vol. 9, No. 1, 1966, pp. 36-45 (1-7).

Yi, et al, "A Comparative Study of Utilizing Topic Models for Information Retrieval," In Proceedings of the European Conference on IR Research Advances in Information Retrieval, 2009, pp. 29-41.

Blei, D. M. et al., "Latent Dirichlet Allocation," Journal of Machine Learning Research, vol. 3, 2003, pp. 993-1022.

Brown, P. F. et al., "An Estimate of an Upper Bound for the Entropy of English," Computational Linguistics, vol. 18, No. 1, 1992, pp. 31-40.

Cover, T. et al., "A Convergent Gambling Estimate of the Entropy of English," IEEE Transactions on Information Theory, vol. 24, No. 4, Jul. 1978, pp. 413-421.

Farmer, S. et al., "The Collapse of the Indus-Script Thesis: The Myth of a Literate Harappan Civilization," Electronic Journal of Vedic Studies, vol. 11, 2004, pp. 379-423 and 623-656.

How, Y. et al., "Optimizing predictive text entry for short message service on mobile phones," In Proceedings of the Human Computer Interfaces International (HCII), 2005, 10 pages.

James, C. L. et al., "Text Input for Mobile Devices: Comparing Model Prediction to Actual Performance," In Proceedings of the SIGCHI Conference on Human Factors in Computing Systems, CHI '01, 2001, pp. 365-371, New York, NY, USA. ACM.

Mackenzie I. S. et al., "Text Entry for Mobile Computng: Models and Methods, Theory and Practice," Human-Computer Interaction, vol. 17, No. 2-3, 2002, pp. 147-198.

Mei, Q. et al., "Entropy of Search Logs: How Hard is Search? With Personalization? With Backoff?" In Proceedings of the international Conference on Web Search and Web Data Mining, WSDM '08, 2008, pp. 45-54.

Moradi, H. et al., "Entropy of English text: Experiments with humans and a machine learning system based on rough sets," Information Sciences, vol. 104, 1998, pp. 31-47.

Nurmi, P. et al., "Predictive Text Input in a Mobile Shopping Assistant: Methods and Interface Design," In Proceedings of the 14th International Conference on Intelligent User Interfaces, IUI '09, 2009, pp. 435-438, New York, NY, USA. ACM.

Rao, R. P. N. et al., "Entropic Evidence for Liguistic Structure in the Indus Script," Science, vol. 324, May 29, 2009, 15 pages.

Ritter, A. et al., "Data-Driven Response Generation in Social Media," In Proceedings of the Conference on Empirical Methods in Natural Language Processing, 2011, pp. 583-593.

Schneider, T. D., "Information Content of Individual Genetic Sequences," Journal of Theoretical Biology, vol. 189, No. 4, 1997, pp. 427-441.

Shannon, C. E., "Prediction and Entropy of Printed English," Bell System Technical Journal, vol. 30, 1951, pp. 50-64.

Teahan, W. J. et al., "The entropy of English using PPM-based models," In Data Compression Conference, 1996, pp. 53-62, IEEE Computer Society Press.

Weizenbaum, J. "Eliza: A Computer Program for the Study of Natural Language Communication Between Man and Machine," Communications of the ACM, vol. 9, No. 1, 1966, pp. 36-45.

Yi, X. et al., "A Comparative Study of Utilizing Topic Models for Information Retrieval," In Proceedings of the European Conference on IR Research on Advances in Information Retrieval, 2009, pp. 29-41.

* cited by examiner

RESPONSE COMPLETION IN SOCIAL MEDIA

TECHNICAL FIELD

The present invention relates generally to messaging and, more particularly, but not exclusively to providing response message completion, on a word-by word basis, in conversational settings.

BACKGROUND

In recent years, the popularity of users messaging other users or posting updates or comments to social media sites with the use of a mobile device has grown considerably. To compose messages on a mobile device, users often employ a miniaturized or virtual keyboard/keypad or a touch-sensitive display screen. Composing messages on such user input devices can be difficult or cumbersome. Thus, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made, to the following Detailed Description, which is to be read in association with the accompanying drawings, wherein.

DETAILED DESCRIPTION

Figure 1:
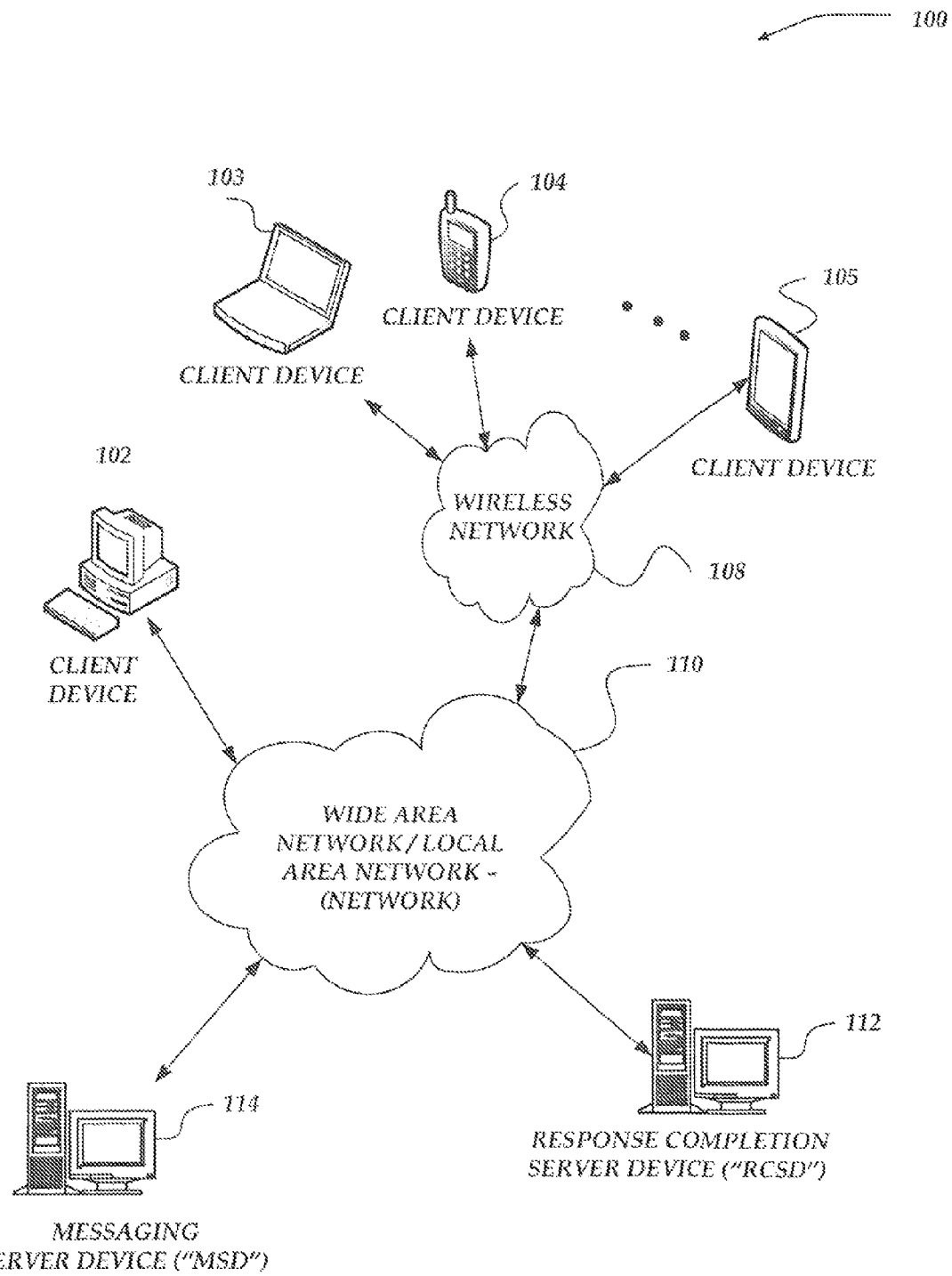
FIG. 1 is a system diagram of an environment in which embodiments of the invention may be implemented.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "language" may include, but is not limited to traditional formal or informal human languages. As used herein, "language" may refer to any communication system using, incorporating, or blending dialects, conversational tones, colloquialisms, slang, shorthand, abbreviations, acronyms, phrases, machine language, pseudo-code, nomenclature, mathematical and logical notations, icons, thumbnails, and such. In short, "language" may refer to any employment of "words" that are used to communicate information. As used herein, the term "word" refers to a building block of a language. A word may include one or more characters, alpha-numeric or otherwise, including white-space or a return character. A word may be a character or collection of characters, emoticons, shapes, symbols, icons, and such. The characters or symbols of a word may be ordered in a definite sequence. As used herein, the term "word(s)" refers to a sequence of one or more words. The sequence may be ordered.

The following briefly describes the embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, embodiments are directed to providing word-by-word auto-completion of a message composed in response to a received stimulus message. In some embodiments, a user partially composes the response message in response to the received stimulus message. A responding user may compose the response message word-by-word. Composing the response message may be performed by typing on a keyboard, keypad, touch-sensitive display, or other such user input device. In some embodiments, when the responding user is about to start typing a new word in the incomplete response message, at least one candidate next word is provided to the user.

In some embodiments, a list of candidate next words is provided to the user. The list of candidate next words may be ordered.

In some embodiments, the at least one provided candidate next word is dynamic and may change in response as the responding user enters one or more characters for the next word. If the word that the responding user is intending to enter is included in the at least one provided candidate next word, the user may select the intended next word. Upon selection of a next word from the at least one candidate next words, the selected word may be included in the incomplete message, thus saving the user typing effort. In some embodiments, this process is continued for each next word in the incomplete response message until the response message is complete. A complete response message may be generated based on the incomplete response message that includes the selected at least one word. The generated complete response message may be provided to the stimulus message sender, the user composing the response message, or other users.

In some embodiments, the at least one candidate next word is determined by a Response Completion Model (RCM). The RCM may model both the language used in the preceding words of the incomplete response message and the contextual information in the earlier received stimulus message. The RCM may determine a list of candidate next words for the next word in an incomplete response message. Thus, the determination of the list of candidate next words is based on the context of the stimulus message and the language of the preceding words in the incomplete response message. In some embodiments, the determination of the list of candidate next words is additionally based on characters already entered for the next word in the incomplete response message.

In some embodiments, the RCM is determined based on stimulus-response data including conversational stimulus-response message pairs. In order to determine the RCM, the model may be trained based on previously observed stimulus-response message pairs. Because the RCM is a language model, the RCM models the language used in the stimulus-response Messages pairs that are employed to train the model. Although message data, including previously observed stimulus-response message pairs is used to determine the RCM, the predicative capabilities of the RCM are not limited to the previously observed stimulus and response messages. Rather, in some embodiments, the RCM may determine or partially determine previously unseen response messages.

Some embodiments may target the determining of the RCM by actively selecting, filtering, or weighting of the stimulus-response pairs used to determine the RCM. Some embodiments may include a plurality of determined RCMs, that are each targeted to a different context. Each of the plurality of RCMs may be determined based on a different plurality of stimulus-response message pairs. For instance, one RCM may be trained with message pairs associated with informal conversations amongst social acquaintances. Another RCM may be trained with stimulus-response message pairs associated with contextual exchanges amongst professional colleagues. Yet another RCM may be trained with stimulus-response message pairs associated with a specific group of users, such as those belonging to a common social network. Still yet another RCM may be trained with stimulus-response message pairs associated with a group of users that typically converse in a specific dialect, and such.

Depending upon the context of use, in some embodiments, an appropriately trained RCM may be selected. A user may actively select the RCM, in response to the type of conversation that the user anticipates. For instance, while conversing informally with a member within a social network, a user may select to use an "informal" RCM. If the user is conversing with a professionally colleague, the user may select to employ a "formal" RCM. The particular RCM that is employed at any given time may be based on, at least user profile data from one or more users participating in the conversation.

Illustrative Operating Environment

FIG. 1 shows components of one embodiment of an environment in which the invention may be practiced. Not all of the components may be required to practice the invention, and variations in the arrangement and type of the components may be made without departing from the spirit or scope of the invention. As shown, system 100 of FIG. 1 includes local area networks ("LANs")/wide area networks ("WANs")-(network) 110, wireless network 108, client devices 102-105, Response Completion Server Device ("RCSD") 112, and Messaging Server Device ("MSD") 114.

At least one embodiment of client devices 102-105 is described in more detail below in conjunction with FIG. 2. In one embodiment, at least some of client devices 102-105 may operate over a wired and/or wireless network, such as networks 110 and/or 108. Generally, client devices 102-105 may include virtually any computing device capable of communicating over a network to send and receive information, perform various online activities, offline actions, or the like. In one embodiment, one or more of client devices 102-105 may be configured to operate within a business or other entity to perform a variety of services for the business or other entity. For example, client devices 102-105 may be configured to operate as a web server, an accounting server, a production server, an inventory server, or the like. However, client devices 102-105 are not constrained to these services and may also be employed, for example, as an end-user computing node, in other embodiments. It should be recognized that more or less client devices may be included within a system such as described herein, and embodiments are therefore not constrained by the number or type of client devices employed.

Devices that may operate as client device 102 may include devices that typically connect using a wired or wireless communications medium such as personal computers, multiprocessor systems, microprocessor-based or programmable electronic devices, network PCs, or the like. In some embodiments, client devices 102-105 may include virtually any portable personal computing device capable of connecting to another computing device and receiving information such as, laptop computer 103, smart mobile telephone 104, and tablet computers 105, and the like. However, portable computing devices are not so limited and may also include other portable devices such as cellular telephones, display pagers, radio frequency ("RF") devices, infrared ("IR") devices, Personal. Digital Assistants ("PDAs"), handheld computers, wearable computers, integrated devices combining one or more of the preceding devices, and the like. As such, client devices 102-105 typically range widely in terms of capabilities and features. Moreover, client devices 102-105 may access various computing applications, including a browser, or other web-based application.

A web-enabled client device may include a browser application that is configured to receive and to send web pages, web-based messages, and the like. The browser application may be configured to receive and display graphics, text, multimedia, and the like, employing virtually any web-based language, including a wireless application protocol messages ("WAP"), and the like. In one embodiment, the browser application is enabled to employ Handheld. Device Markup Language ("HDML"), Wireless Markup Language ("WML"), WMLScript, JavaScript, Standard Generalized Markup Language ("SGML"), HyperText Markup Language ("HTML"), eXtensible Markup Language ("XML"), and the like, to display and send a message. In one embodiment, a user of the client device may employ the browser application to perform various activities over a network (online). However, another application may also be used to perform various online activities.

Client devices 102-105 also may include at least one other client application that is configured to receive and/or send content between another computing device. The client application may include a capability to send and/or receive content, or the like. The client application may further provide information that identifies itself, including a type, capability, name, and the like. In one embodiment, client devices 102-105 may uniquely identify themselves through any of a variety of mechanisms, including an Internet Protocol ("IP") address, a phone number, Mobile Identification Number ("MIN"), an electronic serial number ("ESN"), or other device identifier. Such information may be provided in a network packet, or the like, sent between other client devices, RCSD 112, MSD 114, or other computing devices.

Client devices 102-105 may further be configured to include a client application that enables an end-user to log into an end-user account that may be managed by another computing device, such as RCSD 112, MSD 114, or the like. Such end-user account, in one non-limiting example, may be configured to enable the end-user to manage one or more online activities, including in one non-limiting example, search activities, social networking activities, browse various websites, communicate with other users, or the like. However, participation in such online activities may also be performed without logging into the end-user account.

Wireless network 108 is configured to couple client devices 103-105 and its components with network 110. Wireless network 108 may include any of a variety of wireless sub-networks that may further overlay stand-alone ad-hoc networks, and the like, to provide an infrastructure-oriented connection for client devices 103-105. Such sub-networks may include mesh networks, Wireless LAN ("WLAN") networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router ("WR") mesh, and the like. Access technologies such as 2G, 3G, 4G, 5G, and future access networks may enable wide area coverage for mobile devices, such as client devices 103-105 with various degrees of mobility. In one non-limiting example, wireless network 108 may enable a radio connection through a radio network access such as Global System for Mobil communication ("GSM"), General Packet Radio Services ("GPRS"), Enhanced Data GSM Environment ("EDGE"), code division multiple access ("CDMA"), time division multiple access ("TDMA"), Wideband Code Division Multiple. Access ("WCDMA"), High. Speed Downlink Packet Access ("HSDPA"), Long Term Evolution ("LTE"), and the like. In essence, wireless network 108 may include virtually any wireless communication mechanism by which information may travel between client devices 103-105 and another computing device, network, and the like.

Network 110 is configured to couple network devices with other computing devices, including, RCSD 112, MSD 114, client device 102, and client devices 103-105 through wireless network 108. Network 110 is enabled to employ any form of computer readable media for communicating information from one electronic device to another. Also, network 110 can include the Internet in addition to local area networks ("LANs"), wide area networks ("WANs"), direct connections, such as through a universal serial bus ("USB") port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, and/or other carrier mechanisms including, for example, E-carriers, Integrated Services Digital Networks ("ISDNs"), Digital Subscriber Lines ("DSLs"), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol ("IP"). In essence, network 110 includes any communication method by which information may travel between computing devices.

Additionally, communication media typically embodies computer readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

One embodiment of the RCSD 112 is described in more detail below in conjunction with FIG. 3. Briefly, however, RCSD 112 includes virtually any network device usable to operate as a response server to connect to network 110 to provide response message completion on a word-by-word basis. Devices that may be arranged to operate as RCSD 112 include various network devices, including, but not limited to personal computers, desktop computers, multiprocessor systems, microprocessor-based or programmable consumer electronics, network PCs, server devices, network appliances, and the like.

Likewise, one embodiment of the MSD 114 is described in more detail below in conjunction with FIG. 3. Briefly, however, MSD 114 includes virtually any network device usable to operate as a messaging server to connect to network 110 to provide messaging services. Devices that may be arranged to operate as MSD 114 include various network devices, including, but not limited to personal computers, desktop computers, multiprocessor systems, microprocessor-based or programmable consumer electronics, network PCs, server devices, network appliances, and the like.

Although FIG. 1 illustrates each of RCSD 112 and MSD 114 as single and separate computing devices, the invention is not so limited. For example, RCSD 112 and MSD 114 may be combined in a single computing device or functions or elements of RCSD 112 and MSD 114 may be combined in a single computing device. Likewise, one or more functions of RCSD 112 or MSD 114 may be distributed across one or more distinct network devices. Moreover, RCSD 112 and MSD 114 are not limited to a particular configuration. Thus, in one embodiment, RCSD 112 or MSD 114 may contain a plurality of network devices to provide content to a client device, such as client devices 102-105. Similarly, in another embodiment, RCSD 112 or MSD 114 may contain a plurality of network devices that operate using a master/slave approach, where one of the plurality of network devices of RCSD 112 or MSD 114 operates to manage and/or otherwise coordinate operations of the other network devices. In other embodiments, the RCSD 112 or MSD 114 may operate as a plurality of network devices within a cluster architecture, a peer-to-peer architecture, and/or even within a cloud architecture. Thus, the invention is not to be construed as being limited to a single environment, and other configurations, and architectures are also envisaged.

Illustrative Client Device

Figure 2:
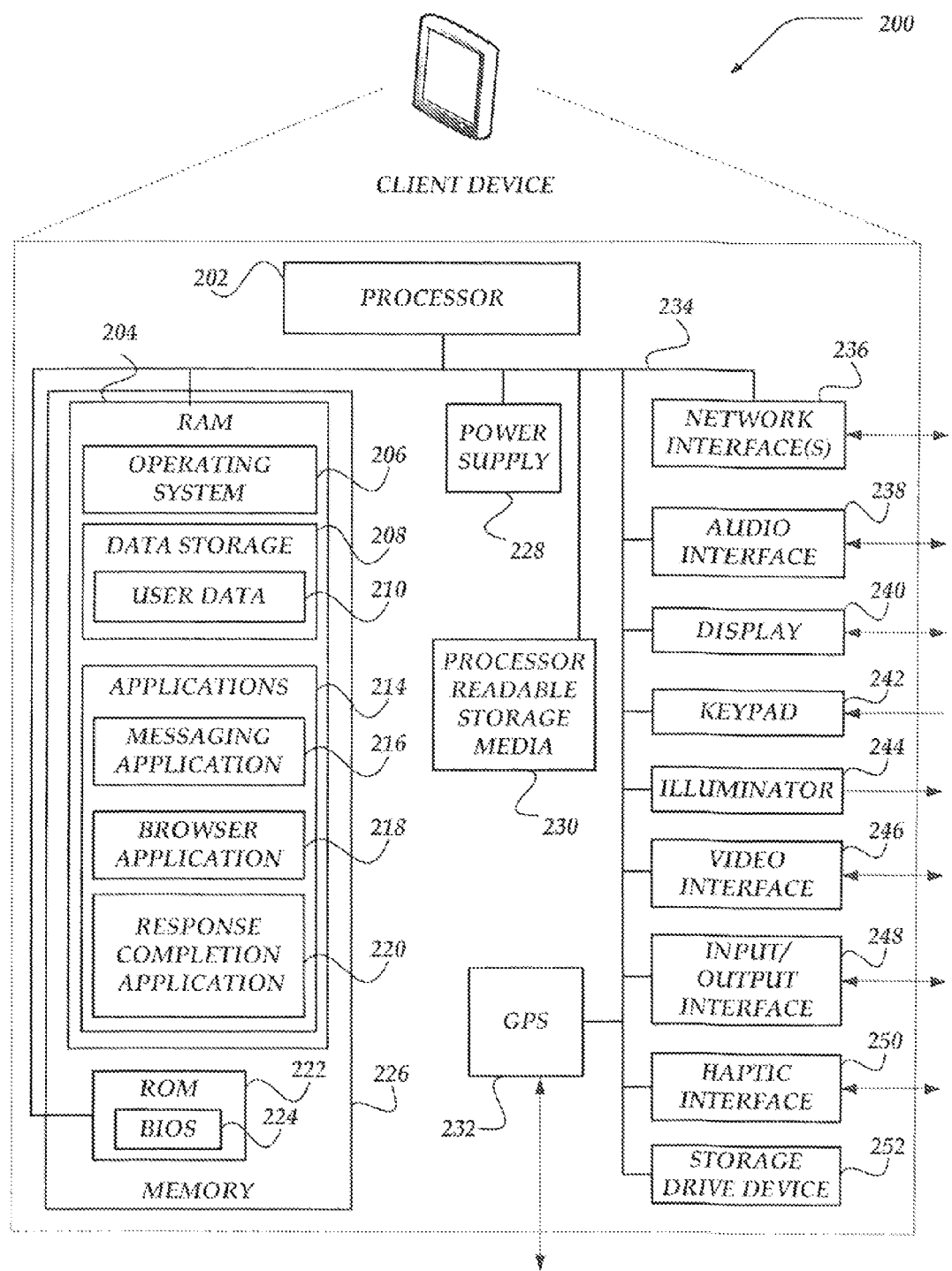
FIG. 2 shows an embodiment of a client device that may be included in a system such as that shown in FIG. 1.

FIG. 2 shows one embodiment, of client device 200 that may be included in a system implementing embodiments of the invention. Client device 200 may include many more or less components than those shown in FIG. 2. However, the components shown are sufficient to disclose an illustrative embodiment for practicing the present invention. Client device 200 may represent, for example, one embodiment of at least one of client devices 102-105 of FIG. 1.

As shown in the figure, client device 200 includes a processor 202 in communication with memory 226 via bus 234. In some embodiments, processor 202 may include one or more central processing units. Client device 200 also includes a power supply 228, one or more network interfaces 236, an audio interface 238, a display 240, a keypad 242, an illuminator 244, a video interface 246, an input/output interface 248, a haptic interface 250, a hard disk 252, and a global positioning system ("GPS") transceiver 232.

Power supply 228 provides power to client device 200. A rechargeable or non-rechargeable battery may be used to provide power. The power may also be provided by an external power source, such as an alternating current ("AC") adapter or a powered docking cradle that supplements and/or recharges a battery.

Client device 200 may optionally communicate with a base station (not shown), or directly with another computing device. Network interface 236 includes circuitry for coupling client device 200 to one or more networks, and is constructed for use with one or more communication protocols and technologies including, but not limited to, global system for mobile communication ("GSM"), code division multiple access ("CDMA"), time division multiple access ("TDMA"), General Packet Radio Services ("GPRS"), Enhanced Data GSM Environment ("EDGE"), Wideband Code Division Multiple Access ("WCDMA"), High Speed Download Packet Access ("HSDPA"), Long Term Evolution ("LTE"), user datagram protocol ("UDP"), transmission control protocol/Internet protocol ("TCP/IP"), SMS, general packet radio service ("GPRS"), WAP, ultra wide band ("UWB"), IEEE 802.16 Worldwide Interoperability for Microwave Access ("WiMax"), session initiated protocol/real-time transport protocol ("SIP/RTP"), or any of a variety of other wireless communication protocols. Network interface 236 is sometimes known as a transceiver, transceiving device, or network interface card ("NIC").

Audio interface 238 is arranged to produce and receive audio signals such as the sound of a human voice. For example, audio interface 238 may be coupled to a speaker and microphone (not shown) to enable telecommunication with others and/or generate an audio acknowledgement for some action.

Display 240 may be a liquid crystal display ("LCD"), gas plasma, light emitting diode ("LED"), organic LED, or any other type of display used with a computing device. Display 240 may also include a touch sensitive screen arranged to receive input from an object such as a stylus or a digit from human hand.

Keypad 242 may comprise any input device arranged to receive input from a user. For example, keypad 242 may include a push button numeric dial, or a keyboard. Keypad 242 may also include command buttons that are associated with selecting and sending images.

Illuminator 244 may provide a status indication and/or provide light. Illuminator 244 may remain active for specific periods of time or in response to events. For example, when illuminator 244 is active, it may backlight the buttons on keypad 242 and stay on while the client device is powered. Also, illuminator 244 may backlight these buttons in various patterns when particular actions are performed, such as dialing another client device. Illuminator 244 may also cause light sources positioned within a transparent or translucent case of the client device to illuminate in response to actions.

Video interface 246 is arranged to capture video images, such as a still photo, a video segment, an infrared video, or the like. For example, video interface 246 may be coupled to a digital video camera, a web-camera, or the like. Video interface 246 may comprise a lens, an image sensor, and other electronics. Image sensors may include a complementary metal-oxide-semiconductor ("CMOS") integrated circuit, charge-coupled device ("CCD"), or any other integrated circuit for sensing light.

Client device 200 also comprises input/output interface 248 for communicating with external devices, such as a headset, or other input or output devices not shown in FIG. 2. Input/output interface 248 can utilize one or more communication technologies, such as USB, infrared, Bluetooth™, or the like. Haptic interface 250 is arranged to provide tactile feedback to a user of the client device. For example, the haptic interface 250 may be employed to vibrate client device 200 in a particular way when another user of a computing device is calling. In some embodiments, haptic interface 250 may be optional.

Client device 200 may also include GPS transceiver 232 to determine the physical coordinates of client device 200 on the surface of the Earth. GPS transceiver 232, in some embodiments, may be optional. GPS transceiver 232 typically outputs a location as latitude and longitude values. However, GPS transceiver 232 can also employ other geo-positioning mechanisms, including, but not limited to, triangulation, assisted GPS ("AGPS"), Enhanced Observed Time Difference ("E-OTD"), Cell Identifier ("CI"), Service Area Identifier ("SAI"), Enhanced Timing Advance ("ETA"), Base Station Subsystem ("BSS"), or the like, to further determine the physical location of client device 200 on the surface of the Earth. It is understood that under different conditions, GPS transceiver 232 can determine a physical location within millimeters for client device 200; and in other cases, the determined physical location may be less precise, such as within a meter or significantly greater distances. In one embodiment, however, mobile device 200 may through other components, provide other information that may be employed to determine a physical location of the device, including for example, a Media Access Control ("MAC") address, IP address, or the like.

Memory 226 includes a Random Access Memory ("RAM") 204, a Read-only Memory ("ROM") 222, and other storage means. Memory 226 illustrates an example of computer readable storage media (devices) for storage of information such as computer readable instructions, data structures, program modules or other data. Memory 226 stores a basic input/output system ("BIOS") 224 for controlling low-level operation of client device 200. The mass memory also stores an operating system 206 for controlling the operation of client device 200. It will be appreciated that this component may include a general-purpose operating system such as a version of UNIX, or LINUX™, or a specialized client communication operating system such as Microsoft Corporation's Windows Mobile™, Apple Corporation's iOS™, Google Corporation's Android™, or the Symbian® operating system. The operating system may include, or interface with a Java virtual machine module that enables control of hardware components and/or operating system operations via Java application programs.

Memory 226 further includes one or more data storage 208, which can be utilized by client device 200 to store, among other things, applications 214 and/or other data. For example, data storage 208 may also be employed to store information that describes various capabilities of client device 200. The information may then be provided to another device based on any of a variety of events, including being sent as part of a header during a communication, sent upon request, or the like. Data storage 208 may also be employed to store social networking information including address books, buddy lists, aliases, user profile information, or the like. Further, data storage 208 may also store messages, web page content, or any of a variety of user generated content. At least a portion of the information may also be stored on another component of client device 200, including, but not limited to processor readable storage media 230, hard disk 252, or other computer readable storage medias (not shown) within client device 200.

Data storage 208 may further store user data 210. User data 210 may include virtually any data stored by a user of client device 200. For example, user data 210 may include a variety of user generated content, such as, but not limited to, movies, videos, music, pictures, illustrations, graphics, images, text, documents, spreadsheets, slideshow presentations, or the like.

Processor readable storage media 230 may include volatile, nonvolatile, removable, and non-removable media implemented in any method or technology for storage of information, such as computer- or processor-readable instructions, data structures, program modules, or other data. Examples of computer readable storage media include RAM, ROM, Electrically Erasable Programmable Read-only Memory ("EEPROM"), flash memory or other memory technology, Compact Disc Read-only Memory ("CD-ROM"), digital versatile disks ("DVD") or other optical storage, magnetic cassettes, magnetic tape, magnetic disk storage or other magnetic storage devices, or any other physical medium which can be used to store the desired information and which can be accessed by a computing device. Processor readable storage media 230 may also be referred to as computer readable storage device.

Applications 214 may include computer executable instructions which, when executed by client device 200, transmit, receive, and/or otherwise process network data. Network data may include, but is not limited to, messages (e.g. SMS, Multimedia Message Service ("MMS"), instant message ("IM"), email, and/or other messages), audio, video, and enable telecommunication with another user of another client device. Applications 214 may include, for example, messaging application 216, browser application 218, response completion application ("RCA") 220, or the like. Applications 214 may include other applications, which may include, but are not limited to, calendars, search programs, email clients, IM applications, SMS applications, voice over Internet Protocol ("VOIP") applications, contact managers, task managers, transcoders, database programs, word processing programs, security applications, spreadsheet programs, games, search programs, and so forth.

Messaging application 216 may be configured to manage a messaging session using any of a variety of messaging communications including, but not limited to email, SMS, IM, MMS, internet relay chat ("RC"), Microsoft IRC ("mIRC"), Really Simple Syndication ("RSS") feeds, and/or the like. For example, in one embodiment, messenger 216 may be configured as an IM application, such as AOL (America Online) Instant Messenger, Yahoo! Messenger, .NET Messenger Server, ICQ ("I seek you"), or the like. In one embodiment, messaging application 216 may be configured to include a mail user agent ("MUA") such as Elm, Pine, Message Handling ("MH"), Outlook, Eudora, Mac Mail, Mozilla Thunderbird, or the like. In another embodiment, messaging application 216 may be a client application that is configured to integrate and employ a variety of messaging protocols, including, but not limited to various push and/or pull mechanisms for client device 200. In one embodiment, messaging application 216 may interact with browser application 218 for managing messages. As used herein, the term "message" refers to any of a variety of messaging formats, or communications forms, including, but not limited to, email, SMS, IM, MMS, IRC, or the like. In one embodiment, messaging application 216 may enable a user of client device 200 to communicate with another network device, such as another client device 200, or the like.

Browser application 218 may include virtually any application configured to receive and display graphics, text, multimedia, and the like, employing virtually any web based language. In one embodiment, the browser application is enabled to employ HDML, WML, WMLScript, JavaScript, SGML, HTML, XML, and the like, to display and send a message. However, any of a variety of other web-based programming languages may be employed. In one embodiment, browser application 218 may enable a user of client device 200 to communicate with another network device, such as RCSD 112, MSD 144, or the like.

RCA 220 may be configured to provide response message completion, on a word-by-word basis. In at least one of the various embodiments, RCA 220 may access response completion information or data from a device, such as RCSD 112 or MSD 114 of FIG. 1. In some embodiments, RCA 220 may perform response message completion on a word-by-word basis in conjunction with RCSD 112 or MSD of FIG. 1. In any event, SBA 220 may employ processes similar to those described below in conjunction with FIGS. 4-5 to perform at least some of its actions.

Illustrative Network Device.

Figure 3:
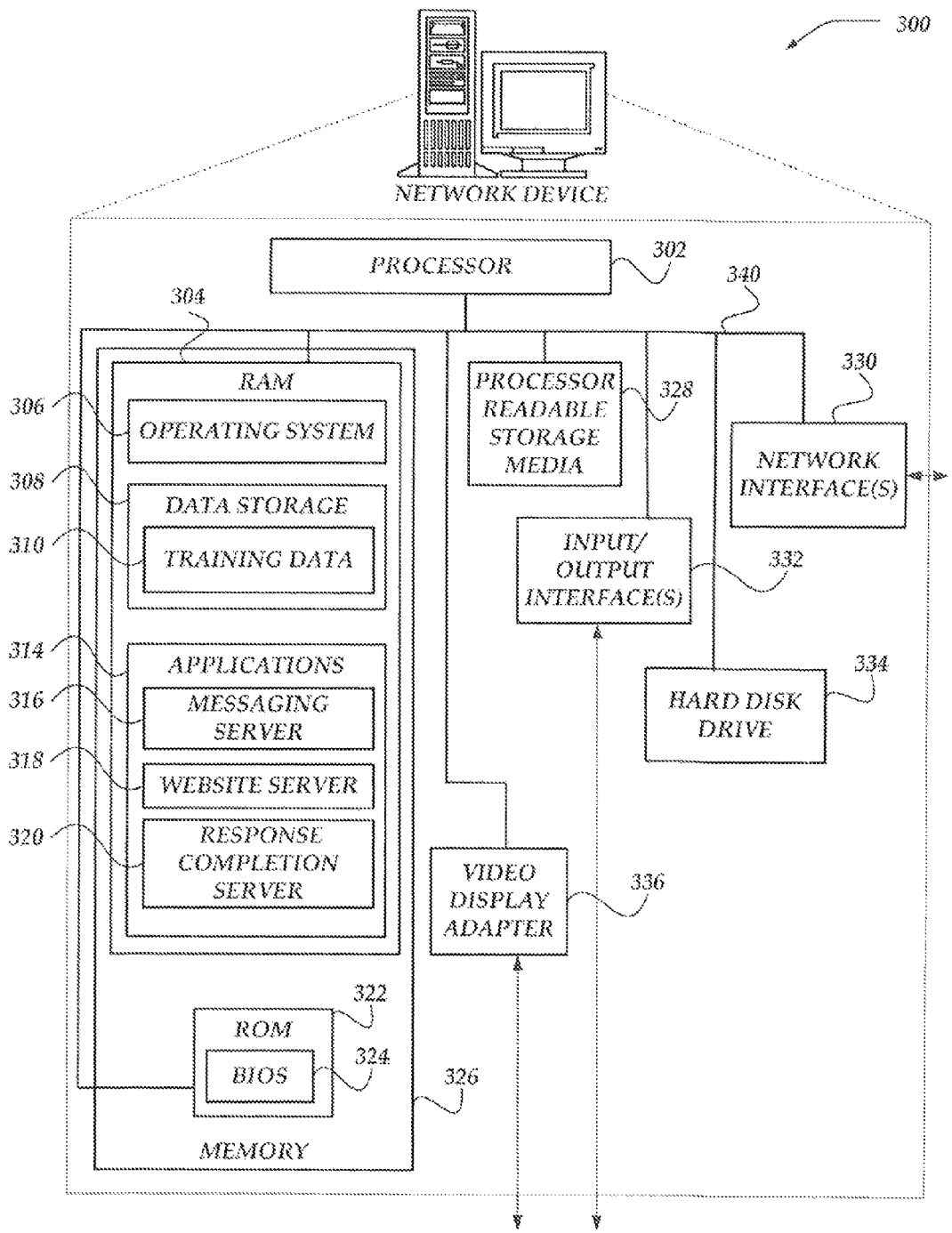
FIG. 3 shows an embodiment, of a network device that may be included in a system such as that shown in FIG. 1.

FIG. 3 shows one embodiment of a network device 300, according to one embodiment of the invention. Network device 300 may include many more or less components than those shown. The components shown, however, are sufficient to disclose an illustrative embodiment for practicing the invention. Network device 300 may be configured to operate as a server, client, peer, or any other device. Network device 300 may represent, for example RCSD 112 and MSD 114 of FIG. 1, or the like.

Network device 300 includes processor 302, processor readable storage media 328, network interface unit 330, an input/output interface 332, hard disk drive 334, video display adapter 336, and memory 326, all in communication with each other via bus 340. In some embodiments, processor 302 may include one or more central processing units.

As illustrated in FIG. 3, network device 300 also can communicate with the Internet, or some other communications network, via network interface unit 330, which is constructed for use with various communication protocols including the TCP/IP protocol. Network interface unit 330 is sometimes known as a transceiver, transceiving device, or network interface card ("NIC").

Network device 300 also comprises input/output interface 332 for communicating with external devices, such as a keyboard, or other input or output devices not shown in FIG. 3. Input/output interface 332 can utilize one or more communication technologies, such as USB, infrared, Bluetooth™, or the like.

Memory 326 generally includes RAM 304, ROM 322 and one or more permanent mass storage devices, such as hard disk drive 334, tape drive, optical drive, and/or floppy disk drive. Memory 326 stores operating system 306 for controlling the operation of network device 300. Any general-purpose operating system may be employed. Basic input/output system ("BIOS") 324 is also provided for controlling the low-level operation of network device 300.

Although illustrated separately, memory 326 may include processor readable storage media 328. Processor readable storage media 328 may be referred to and/or include computer readable media, computer readable storage media, and/or processor readable storage device. Processor readable storage media 328 may include volatile, nonvolatile, removable, and non-removable media implemented in any method or technology for storage of information, such as computer readable instructions, data structures, program modules, or other data. Examples of processor readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by a computing device.

Memory 326 further includes one or more data storage 308, which can be utilized by network device 300 to store, among other things, applications 314 and/or other data. For example, data storage 308 may also be employed to store information that describes various capabilities of network device 300. The information may then be provided to another device based on any of a variety of events, including being sent as part of a header during a communication, sent upon request, or the like. Data storage 308 may also be employed to store messages, web page content, or the like. At least a portion of the information may also be stored on another component of network device 300, including, but not limited to processor readable storage media 328, hard disk drive 334, or other computer readable storage medias (not shown) within client device 200.

Data storage 308 may include a database, text, spreadsheet, folder, file, or the like, that may be configured to maintain and store user account identifiers, user profiles, email addresses, IM addresses, and/or other network addresses; or the like. Data storage 308 may further include program code, data, algorithms, and the like, for use by a processor, such as processor 302 to execute and perform actions. In one embodiment, at least some of data storage 308 might also be stored on another component of network device 300, including, but not limited to processor-readable storage device 328, hard disk drive 334, or the like.

Data storage 308 may further store training data 310, including stimulus-response data or stimulus-response message pairs. Training data 310 may additionally include user data copied from one or more client devices, such as client device 200 of FIG. 2. For example training data 310 may include user data 210 of FIG. 2 from a plurality of client devices. In some embodiments, training data 310 may store additional stimulus-response data originating in user data for a client device.

Applications 314 may include computer executable instructions, which may be loaded into mass memory and run on operating system 306. Examples of application programs may include transcoders, schedulers, calendars, database programs, word processing programs, Hypertext Transfer Protocol ("HTTP") programs, customizable user interface programs, IPSec applications, encryption programs, security programs, SMS message servers, IM message servers, email servers, account managers, and so forth. Messaging server (MS) 316, website server 318, and Response Completion Server ("RCS") 320 may also be included as application programs within applications 314.

Messaging server 316 may include virtually any computing component or components configured and arranged to forward messages from message user agents, and/or other message servers, or to deliver messages to a local message store, such as data storage 308, or the like. Thus, messaging server 316 may include a message transfer manager to communicate a message employing any of a variety of email protocols, including, but not limited to, Simple Mail Transfer Protocol ("SMTP"), Post Office Protocol ("POP"), Internet Message Access Protocol ("IMAP"), Network New Transfer Protocol ("NNTP"), or the like. Messaging server 316 may also be managed by one or more components of messaging server 316. Thus, messaging server 316 may also be configured to manage SMS messages, IM, MMS, IRC, RSS feeds, mIRC, or any of a variety of other message types. In one embodiment, messaging server 316 may enable users to initiate and/or otherwise conduct chat sessions, VOIP sessions, or the like.

Website server 318 represent any of a variety of information and services that are configured to provide content, including messages, over a network to another computing device. Thus, website server 318 can include, for example, a web server, a File Transfer Protocol ("FTP") server, a database server, a content server, or the like. Web server 318 may provide the content including messages over the network using any of a variety of formats including, but not limited to WAP, HDML, WML, SGML, HTML, XML, Compact HTML ("cHTML"), Extensible HTML ("xHTML"), or the like.

RCS 320 or messaging server 316 may be configured to communicate with RCA 220 or messaging application 216 of FIG. 2 to facilitate the response message completion. For example, RCS 320 or messaging server 316 may receive messaging data, response completion data, user data, such as user data 210 of FIG. 2 from client device 200 of FIG. 2, and store the received user data in training data 310. In some embodiments RCS 320 or messaging server 316 may provide user data, training data, messaging data, response completion data, and the like to client device 200.

General Operation

Figure 4:
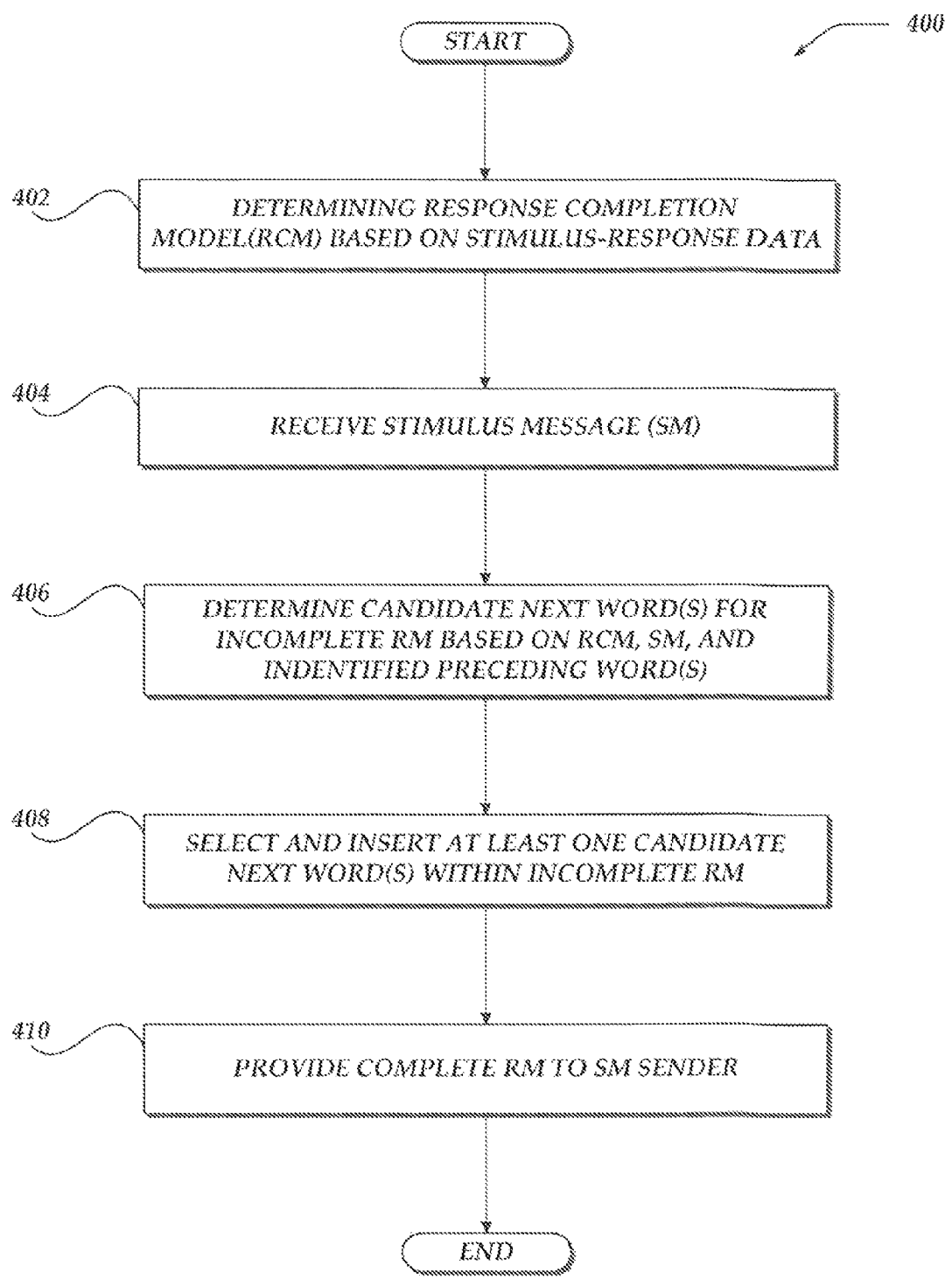
FIG. 4 illustrates a logical flow diagram generally showing one embodiment of an overview process for providing response message completion in conversational settings.

The operation of certain aspects of the invention will now be described with respect to FIGS. 4-10. FIG. 4 illustrates a logical flow diagram generally showing one embodiment of an overview process for providing response message completion in conversational settings. In some embodiments, process 400 of FIG. 4 may be implemented by and/or executed on a single network device, such as network device 300 of FIG. 3. In other embodiments, process 400 or portions of process 400 of FIG. 4 may be implemented by and/or executed on a plurality of network devices, such as RCSD 112 or MSD 114 of FIG. 1. In yet other embodiments, process 400 or portions of process 400 of FIG. 4 may be, implemented by and/or executed on a client device, such as client device 200 of FIG. 2.

Process 400 begins, after a start block, at block 402, where a Response Completion Model (RCM) may be determined based on stimulus-response data. In some embodiments, the RCM includes at least a generic response model (LM), a stimulus model, and a mixing parameter. In some embodiments, determining the RCM includes training the RCM based on the stimulus-response model. In some embodiments, the stimulus-response data may include training data.

In some embodiments, the stimulus-response data may include a large-scale dataset with textual exchanges. The stimulus-response data may include messages exchanged amongst a plurality of users. The stimulus-response data may include a plurality of conversational message pairs, with one message in the conversational message pair being a stimulus message and the corresponding other message in the conversational pair message being a response message.

In some embodiments, the corresponding stimulus and response message pairs are temporally ordered, with the stimulus message being the earlier of the two messages. The response message may be authored, composed, determined, or sent in response to receiving, reading, or analyzing the corresponding stimulus message. In some embodiments, a stimulus message may include a question or inquiry. The corresponding response message may include an answer or a clarifying question in response to the question or inquiry included in the stimulus message. In some embodiments, a stimulus message may include a search query and the corresponding response message may include a search result.

In some embodiments, the stimulus-response message pairs may originate from interne forums, such as Yahoo! News, usenet forums, and the like. Other sources of stimulus-response message pairs include, but are not limited to text messages, instant messages, social media chat sessions, comment sections associated with news sites or news aggregators, blogs, and the like. In many such sources, users may post a new comment of reply to an existing comment. A popular comment can have a long thread of replies where multi-party discussions take place. A stimulus-response message pair may include an initial user comment and a first reply to the comment. The stimulus-response message pairs may include consecutive user comments. In some embodiments, the stimulus message in a stimulus-response message pair may be the response message in another stimulus-response message pair. Likewise, a response message in a stimulus-response message pair may be the stimulus message in another stimulus-response message pair. Furthermore, a stimulus-response message pair may include any two user comments. The users that composed, sent, or posted either the stimulus or the response message in any stimulus-response message pair may be the same user or different users.

In some embodiments, at least one of the stimulus or response messages may be generated automatically. In some embodiments, the stimulus-response data may include a large number of message pairs resulting from conversational exchanges among a plurality of users taken from a plurality of sources. The users providing message data may be selectively targeted or filtered. In some embodiments, the plurality of sources and target users which provide stimulus-response message pairs may be blended together to provide customized stimulus-response data.

In any event, the stimulus-response data is used to determine the RCM. Although described in greater detail below, the determined RCM may be employed to determine at least one candidate next word for an incomplete response message based on a stimulus message. In some embodiments, the determined RCM determines a list of candidate next word. If the RCM determines more than one candidate next words, the candidate next words may be ranked or ordered. The ranking or ordering may be based on at least one probability or likelihood determined by the RCM.

As described in greater detail below in conjunction with FIGS. 5, 6, and 7, determining the RCM may include analyzing a plurality of the stimulus-response message pairs in the stimulus-response data and employing information from the message pair analysis to model both the language used in a response message and the contextual information provided in the corresponding stimulus message Process 400 continue to block 404, where a stimulus message (SM) is received from a stimulus message sender. In some embodiments, the received stimulus message may be sent by a client device 102-105 of FIG. 1, or some other network device, such as RCSD 112 or MSD 114 of FIG. 1. The received stimulus message may be composed by a user or determined by automated means. The received stimulus message need not be, although may be, identical or similar to a stimulus message or a response message included in the stimulus-response data used to determine the RCM.

In some embodiments, an incomplete response message may be composed in response to the received stimulus message. A user may compose the incomplete response message. In composing the incomplete response message, the user may employ a client device, such as 102-105 of FIG. 1, or some other network device, such as RCSD 112 or MSD 114 of FIG. 1. The incomplete response message may include any number of words or characters, including none. The last word in the incomplete response message may include any number of characters, including none.

In some embodiments, the sender of the received stimulus message and the user composing the incomplete response message may exchange textual messages. The sender of the received stimulus message and the composer of the incomplete response message may be participating in an ongoing conversation amongst themselves or amongst other users. The sender of the received stimulus message and the composer of the incomplete response message may belong to a common social network.

Process 400 next proceeds to block 406, where if the incomplete response message includes at least one preceding word, at least one candidate next word for the incomplete response message is determined based on the RCM, the stimulus message, and the at least one preceding word. In some embodiments, if the incomplete response message is absent any word, at least one candidate next word for the incomplete response message is determined based on at least the RCM and the stimulus message.

In some embodiments, at least one preceding word within the incomplete response message is identified. In some embodiments, the at least one identified preceding word may include the last word of the incomplete response message. In some embodiments, the at least one identified preceding word may include at least the last two words of the incomplete response message. The at least one identified preceding word may include at least one word that is incomplete. For instance, if only some of the characters in the last word of the incomplete message have been typed by the user composing the incomplete response message, then the at least one identified proceeding word may contain at least one of the letters typed by the user.

In some embodiments, if more than one candidate next word for the incomplete response message is determined, a list of candidate next words for the incomplete response message may be determined based on the RCM, the stimulus message, and the at least one identified preceding word in the incomplete response message. The list may be ranked or ordered. The ranking or ordering may be based on at least one determined probability or likelihood. The details regarding the determination of the at least one candidate next word are described below in conjunction with FIGS. 9 and 10.

In some embodiments, the at least one determined candidate next word is provided to the user composing the incomplete response message. In some embodiments, if a list of candidate next words is determined, a list including at least one of the candidate next words may be provided to the user. The list of candidate next word provided to the user may be displayed in a pop-up style window or drop-down style menu. The list of candidate next words provided to the user may be displayed in a similar or different font style, color, size, and such than the font style, color, size, and such that the incomplete response message is displayed with.

In any event, process 400 next proceeds to block 408, where at least one word from the at least one determined candidate next word is selected. In some embodiments, the selected at least one word is selected by the user composing the incomplete response message. The user may select the at least one word with a mouse click, by touching a touch sensitive display, or with the use of any other such user input device. In other embodiments, the selected at least one word may be selected automatically. In some embodiments, the selected at least one word may be selected by another user.

In some embodiments, the selected at least one word is included within the incomplete response message. In some embodiments included selected word is included as the next word in the incomplete response message. The included word may, or may not, complete the response message. At block 410, a complete response message that is based on the incomplete response message is generated. The generated complete response message may be provided to the stimulus message sender. The complete response message may include the selected at least one word. The complete response message may be provided to the user composing the response message. The complete response message may be provided to other users. In some embodiments the completed response message becomes a stimulus messages and the process loops back to block 404.

Figure 5:
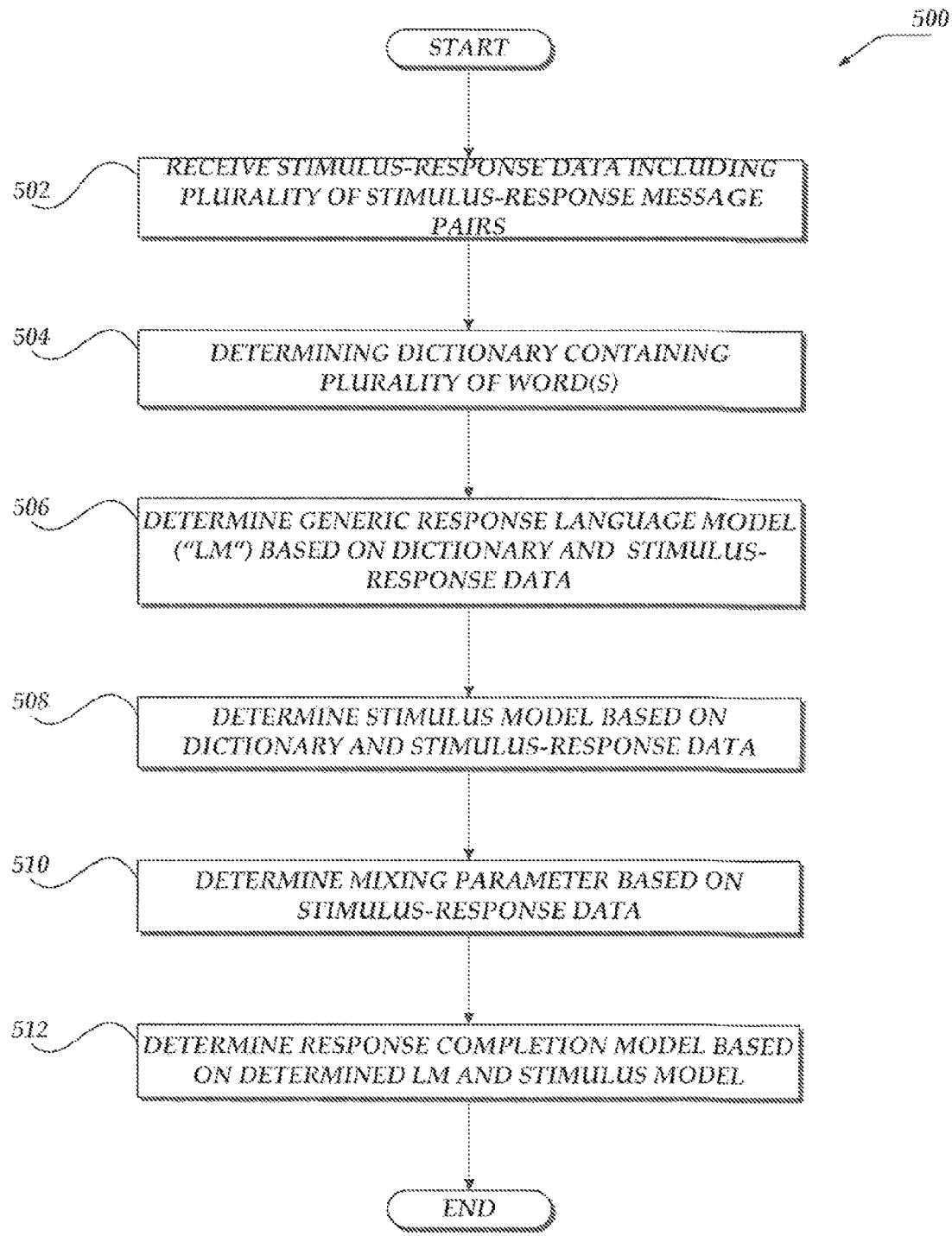
FIG. 5 illustrates a logical flow diagram generally showing one embodiment of an overview process for training a Response Completion Model based on stimulus-response data.

FIG. 5 illustrates a logical flow diagram generally showing one embodiment of an overview process for training a Response Completion. Model based on stimulus-response data. In some embodiments, process 500 of FIG. 5 may be implemented by and/or executed on a single network device, such as network device 300 of FIG. 3. In other embodiments, process 500 or portions of process 500 of FIG. 5 may be implemented by and/or executed on a plurality of network devices, such as RCSD 112 or MSD 114 of FIG. 1. In yet other embodiments, process 500 or portions of process 500 of FIG. 5 may be implemented by and/or executed on a client device, such as client device 200 of FIG. 2.

Process 500 begins, after a start block, at block 502, where stimulus-response data including a plurality of stimulus-response message pairs is received. As described above in conjunction with block 402 of FIG. 4, the stimulus-response data may be received from various sources. Any number of stimulus-response message pairs may be received, with no upper or lower limits to the number of stimulus-response message pairs. Some embodiments may receive tens or hundreds of millions of stimulus-response messages pairs generated by millions of unique users. Each of the received stimulus-response message pairs may be unique, or some of the received stimulus-message pairs may be duplicative.

Process 500 proceeds to block 504, where a dictionary containing a plurality of word is determined. In some embodiments, the determined dictionary may be based on the received plurality of stimulus-response message pairs. The determined dictionary may include at least a portion of the unique words included in the plurality of received stimulus-response message pairs. In some embodiments, the determined dictionary may be based, at least in part, on sources other than the received stimulus-response message pairs. Such sources may include, but are not limited to materials such as other dictionaries, thesauruses, wiki-style documents, encyclopedias, and the like. The determined dictionary may be customized to particular users, social media networks, or other such groupings. The dictionary may be determined based on at least user profiles. In some embodiments, the dictionary may be provided from other sources.

Process 500 continues next at block 506, where the LM is determined based on at least the dictionary and the stimulus-response data. In some embodiments, the LM is determined based on at least the response messages from the received stimulus-response data. For each word in the determined dictionary, the LM may determine an LM Probability, conditioned on an incomplete an incomplete response message. In some embodiments, the determination of the LM Probability may be based on at least one identified preceding word within the incomplete response message. In some embodiments, the determination of the LM Probability does not depend on the contextual information of a stimulus message.

The LM may be based on an N-gram language model. The N-gram language model may be determined based on the response messages included in the received stimulus-response data. Consider a stimulus-response message pair from the received plurality of stimulus-response pairs. The stimulus message includes a sequence of words $s=(s_1, s_2, \ldots, s_m)$, and the corresponding response message includes another sequence of words $r=(r_1, r_2, \ldots, r_n)$. The stimulus message includes m words and the corresponding response message includes n words. The LM Probability, $P(r_{i+1}|r_{1\ldots i})$ for a word, $r_{i+1}$, may be a measure of the likelihood that word is the intended next word in the incomplete response message and the determination of the LM Probability is based on at least one of the preceding words, $r_{1\ldots i}$ in the incomplete response message.

Some embodiments may employ a trigram language model (N=3). Other embodiments may employ any other value for N, including unigram (N=1) or a bigram (N=2) model. An example of a trigram model is as follows:

$$P=(r_{i+1}|r_{1\ldots i})=\lambda_1 *P_3(r_{i+1}|r_i,r_{i-1})+(1-\lambda_1)*P_1(r_{i+1}) \quad (1)$$

An example of a bigram model is as follows:

$$P(r_{i+1}|r_{1\ldots i})=\lambda_1 *P_2(r_{i+1}|r_i)+(1-\lambda_1)*(r_{i+1}) \quad (2)$$

Some embodiments set of the value of $\lambda_1=0.9$, but the value can range between 0 and 1. The values of $P_1(r_{i+1})$, $P_2(r_{i+1}|r_i)$, and $P_3(r_{i+1}|r_{i-1})$ are determined based on observing the response messages in the received stimulus-response message pairs. A determined LM model refers to an N-gram model wherein the $P_n$s have been determined. By applying a determined LM to an incomplete response message, the LM determines the LM Probability, conditioned on the incomplete response message, for a word included in the identified dictionary. Therefore, the LM may rank next candidate words from the identified dictionary based on the language used in the incomplete response message. In some embodiments, the candidate next words are ranked based on at least the LM. Probabilities for each candidate next word.

Process 500 continues next at block 508, where the Stimulus Model is determined based on the dictionary and stimulus-response data. In some embodiments, the Stimulus Model is determined based on at least the stimulus messages from the received stimulus-message pairs. For each word in the determined dictionary, the Stimulus Model may determine a Stimulus Probability, conditioned on the received stimulus message. The determination of the Stimulus Probability may be based on at least the contextual information in the received stimulus message. In some embodiments, the determination of the Stimulus Probability may be based on a selected word within the stimulus message. In other embodiments, the determination of the Stimulus Probability may be based or at least one topic associated with the stimulus message. In some embodiments, the determination of the Stimulus Probability may not depend on the language used in the incomplete response message. Therefore, the Stimulus Model may rank next candidate words from the dictionary based on the contextual information in the received stimulus message. In some embodiments, the candidate next words are ranked based on at least the Stimulus Probabilities for each candidate next word.

The Stimulus Probability, $P(r_{i+1}|s)$, for a word, $r_{i+1}$, may be a measure of the likelihood that word $r_{i+1}$ is the intended next word in the incomplete response message that is being composed in response to stimulus message s. The LM and Stimulus Model may be mixed based on a mixing parameter. In block 510, the mixing parameter is determined based on at least the stimulus-response data.

Two embodiments for a Stimulus Model are discussed below. The first embodiment is based on a "Selection Model". The "Selection Model" is based on the intuition that to be semantically coherent, a response message often needs to repeat certain content words in the corresponding stimulus The LM and "Selection Model" are mixed to determine a "LM+Selection Model," which in turn, determines RCM. The second embodiment is based on a "Topic Model." The "Topic Model" incorporates information provided in the stimulus message and uses it to constrict the topic of the incomplete response message. Likewise, the LM and the "Topic Model" are mixed to determine a "LM+Topic Model," which in turn, determines the RCM. Both the "LM+Selection Model" and the "LM+Topic Model" are determined by employing the received stimulus-response data.

The details of an embodiment that employs the "Selection Model" to determine the Stimulus Model, the mixing parameter, and the RCM are discussed below in conjunction with FIG. 6. The details to determine the Stimulus Probability for a word in the dictionary using the Stimulus Model determined by a "Selection Model" are discussed below in conjunction with FIG. 9. The details of an embodiment that employs a "Topic Model" to determine the Stimulus Model, the mixing parameter, and the RCM are discussed below in conjunction with FIG. 7. The details to determine the Stimulus Probability for a word in the dictionary using a Stimulus Model determined by a "Topic Model" are discussed below in conjunction with FIG. 10.

In any event, process 500 proceeds to block 512, where the RCM is determined based on at least the LM, Stimulus Model, and the mixing parameter. The RCM may be determined by a linear mixture of the Stimulus Model and LM, with a mixture parameter Xs.

$$P(r_{i+1}|s, r_1 \ldots i) = \lambda_s * P(r_{i+1}|s) + (1-\lambda_s) * P(r_{i+1}|r_1 \ldots i) \quad (3)$$

For each word in the dictionary, the RCM may determine a Completion Probability, $P(r_{i+1}|s, r_1 \ldots i)$, conditioned on the received stimulus message and the incomplete response message. The Completion Probability for word $r_{i+1}$ may be a measure of the likelihood that word $r_{i+1}$ is the intended next word in the incomplete response message. The determination of the Completion Probability may be based on the contextual information of the received stimulus message and the language within the incomplete response message. Therefore, the RCM may rank next candidate words from the dictionary based on the contextual information in the received stimulus message and the language used in the incomplete response message. In some embodiments, the RCM ranks candidate next words are ranked based on at least the Completion Probabilities for each candidate next word.

Figure 6:
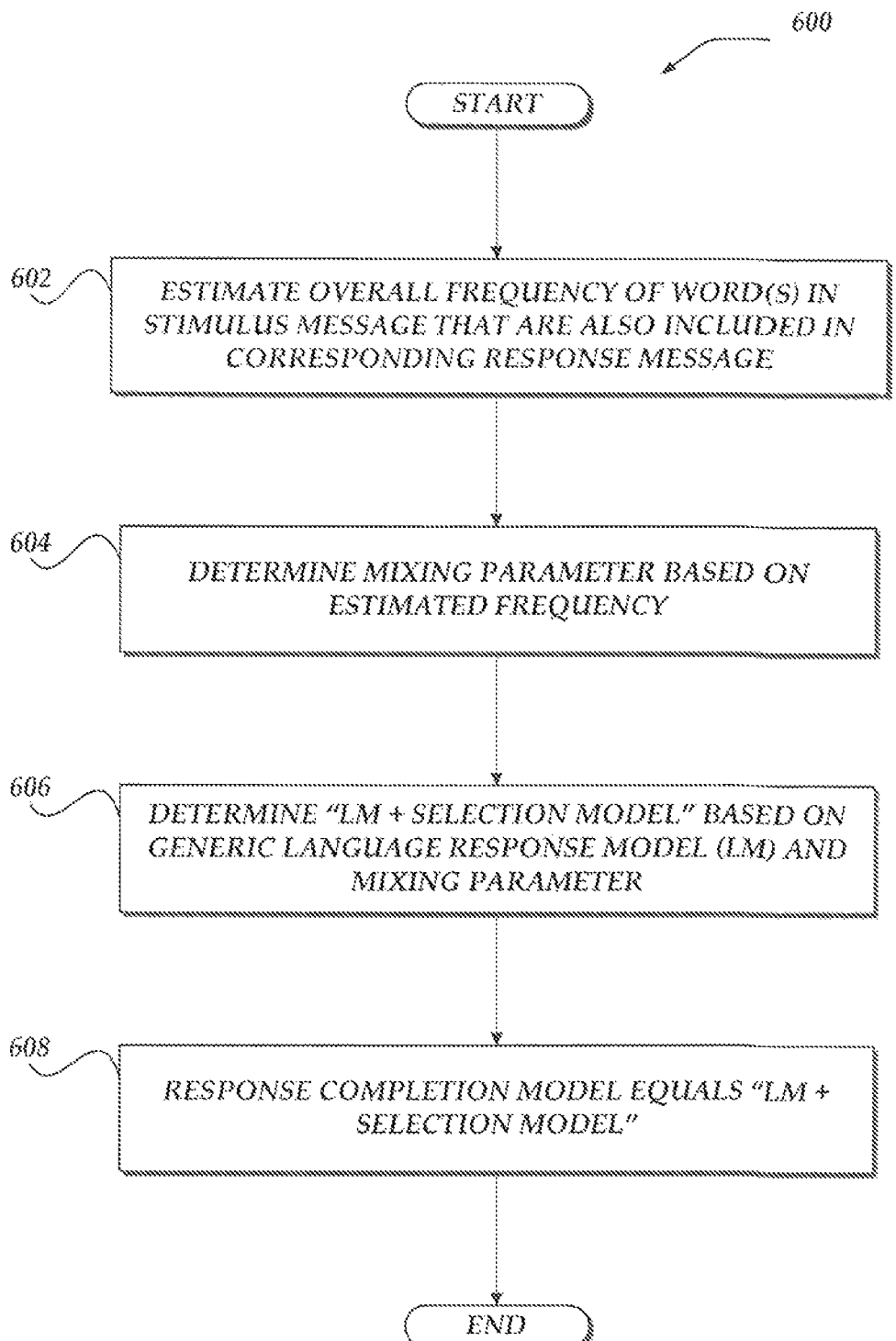
FIG. 6 illustrates a logical flow diagram generally showing one embodiment of an overview process for determining the Response Completion Model including a Stimulus Model based on a "Selection Model"

FIG. 6 illustrates a logical flow diagram generally showing one embodiment of an overview process for determining the Response Completion Model including a Stimulus Model based on a "Selection Model." In some embodiments, process 600 of FIG. 6 may be implemented by and/or executed on a single network device, such as network device 300 of FIG. 3. In other embodiments, process 600 or portions of process 600 of FIG. 6 may be implemented by and/or executed on a plurality of network devices, such as RCSD 112 or MSD 114 of FIG. 1. In yet other embodiments, process 600 or portions of process 600 of FIG. 6 may be implemented by and/or executed on a client device, such as client device 200 of FIG. 2.

Process 600 begins, after a start block, at block 602, where an estimated overall frequency of each word in at least one stimulus message from a plurality of stimulus-response message pairs that are also included in each corresponding response message from the plurality of stimulus-response message pairs is determined. The plurality of stimulus-response message pairs is included in the received stimulus-response data. The estimated frequency may approximate the likelihood of a response word being a repetition of a word in the corresponding stimulus. This is based on the intuition that to be semantically coherent, a response message often needs to repeat certain content words in the stimulus message. This is particularly useful for words that are less frequently used. More specifically, the Stimulus Probability, for a determined "Selection Model," word and stimulus message s may be determined by $$P(r_{i+1}|s) = \frac{1_{r+1 \in s}}{|s|} \quad (4)$$

Process 600 continues next at block 604 where the mixing parameter, $\lambda_s$, from equation (3), is determined based on at least the estimated frequency. In some embodiments, $\lambda_s$, is set equal to the value of the estimated frequency. At block 606, the "LM+Selection Model" is determined based on the LM and the determined mixing parameter, $\lambda_s$. In some embodiments, the Stimulus Probabilities are determined by equation (3). At block 608, the RCM is determined based on at least the LM, the Stimulus Model, and the mixing parameter. In some embodiments, the RCM is set equal to the determined "LM+Selection Model."

Figure 7:
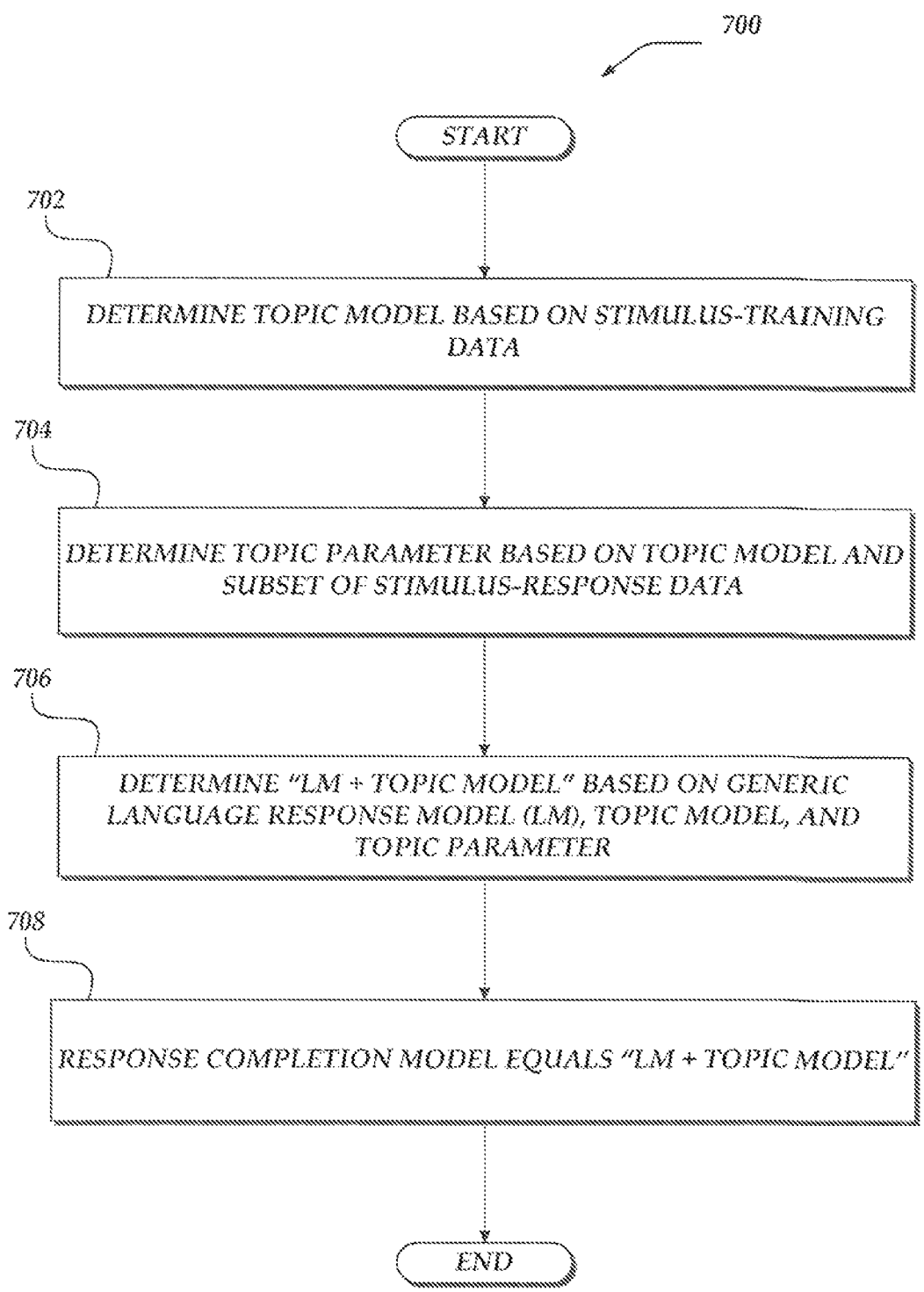
FIG. 7 illustrates a logical flow diagram generally showing one embodiment of an overview process for determining the Response Completion Model including a Stimulus Model based on a "Topic Model"

FIG. 7 illustrates a logical flow diagram generally showing one embodiment of an overview process for determining the Response Completion Model including a Stimulus. Model based on a "Topic Model." In some embodiments, process 700 of FIG. 7 may be implemented by and/or executed on a single network device, such as network device 300 of FIG. 3. In other embodiments, process 700 or portions of process 700 of FIG. 7 may be implemented by and/or executed on a plurality of network devices, such as RCSD 112 or MSD 114 of FIG. 1. In yet other embodiments, process 700 or portions of process 700 of FIG. 7 may be implemented by and/or executed on a client device, such as client device 200 of FIG. 2.

Process 700 begins, after a start block, at block 702, where a Topic Model is determined based on the received stimulus-response data. The Topic Model provides another way to incorporate contextual information provided by a received stimulus message s. The Topic Model determines one or more topics associated with the received stimulus message, and uses the determined topics to restrict the considered topics associated with the at least one candidate next word for the response message. Some embodiments may use a Latent Dirchlet Allocation (LDA) algorithm to determine the Topic Model. More specifically, the Topic Model is determined from the received stimulus-response pairs. In some embodiments, the Topic Model may determine a Topic Probability for each of a plurality of candidate topics for a received stimulus message, P(topic=t|s). In some embodiments, the Topic Model determines topics that may be associated with a received stimulus message. In some embodiments, for a given topic candidate and received stimulus message, a higher value for the determined Topic Probability indicates a higher likelihood that the candidate topic is associated with the received stimulus message. In some embodiments, the most probable topic, t*, of the received stimulus message is used to constrain the topic of the incomplete response message, where $$t^* = \text{argmax}_t(\text{topic}=t|s)$$

The Stimulus Probability for a determined Topic Model, word $r_{i+1}$, and stimulus message s may be determined based one or more Topic Probabilities determined by the Topic Model. In some embodiments, the Stimulus Probability may be determined as, $$P(r_{i+1}|s) = P(r_{i+1}|t^*) \quad (5)$$

Where P(r|t) are determined based on the stimulus-response data. In other embodiments, more than one possible topic assignments may be considered. In some embodiments, all topic assignments above a threshold probability may be considered. In some embodiments, the probabilities may be summed over a plurality topics.

Process 700 continues next at block 704 where the value of the mixing parameter, $\lambda_s$ is determined based on at least the determined Topic Model. In some embodiments, the value of $\lambda_s$ is based on the determined Topic Probabilities. In some embodiments, $\lambda_s = \lambda_{topic} * P(t^*|s)$, where the value of $\lambda_{topic}$ is determined from the received stimulus-response data. In some embodiments, $\lambda_{topic}$ may be determined by reserving a portion of the received stimulus-response message pairs specifically for optimizing its value. A grid search may be performed, while varying the value of $\lambda_{topic}$, and choosing a value that gives a best performance.

At block 706, the "LM+Topic Model" is determined based on the Topic Model, the LM, and the mixing parameter, $\lambda_s$. In some embodiments, the "LM+Topic Model" is determined by equation (3). At block 708, the Response Completion Model is set equal to the determined "LM+Topic. Model," and thus the RCM is determined based on the Topic Model, LM, and the mixing parameter.

Figure 8:
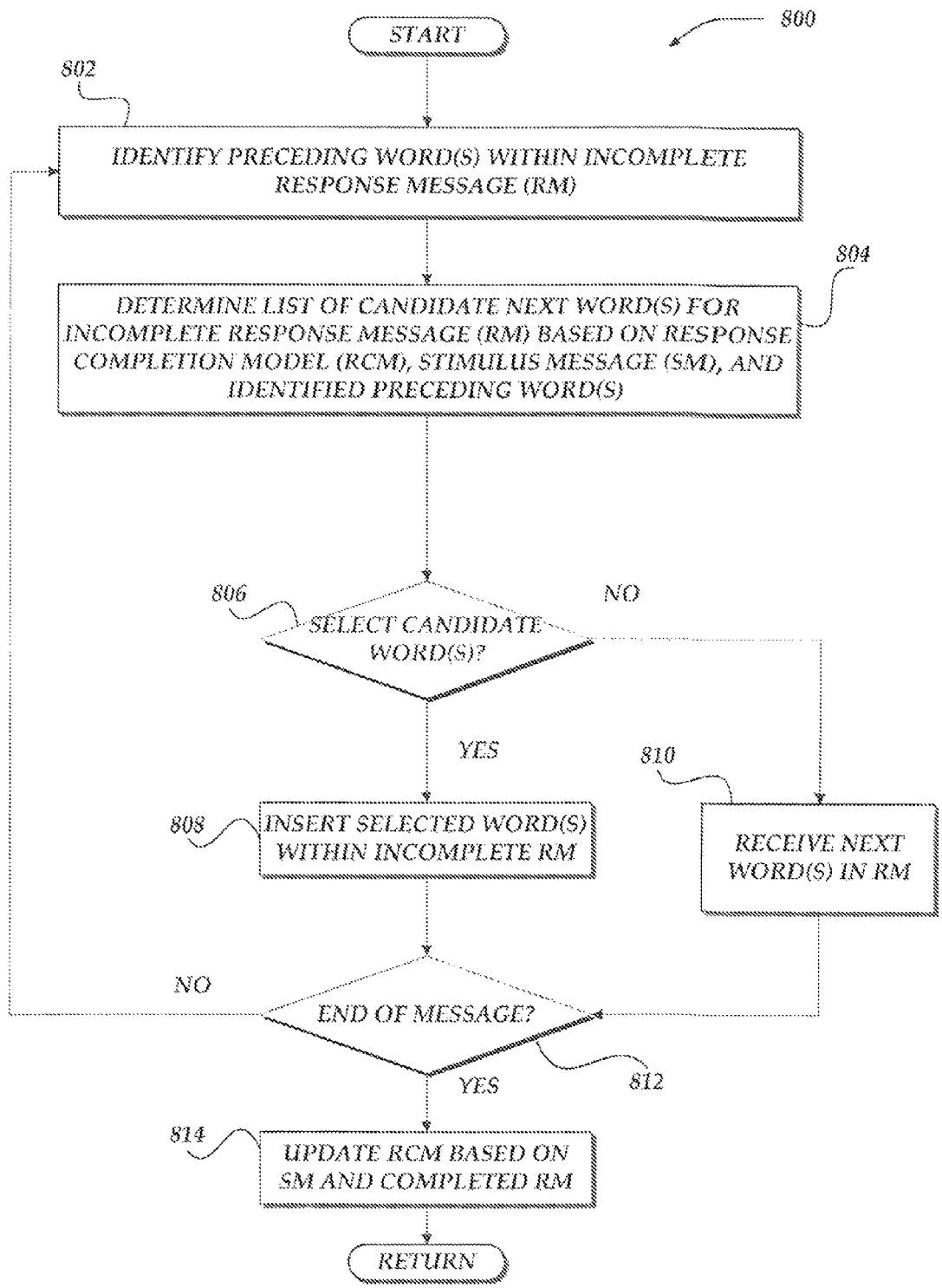
FIG. 8 illustrates a logical flow diagram generally showing one embodiment of an overview process for providing response message completion, on a word-by word basis, in conversational settings wherein a user may select a word to be inserted in the response message and the Response Completion Model is updated with additional stimulus-response data.

FIG. 8 illustrates a logical flow diagram generally showing one embodiment of an overview process for providing response message completion, on a word-by word basis, in conversational settings wherein a user may select a word to be inserted in the response message and the Response Completion Model is updated with additional stimulus-response data. In some embodiments, process 800 of FIG. 8 may be implemented by and/or executed on a single network device, such as network device 300 of FIG. 3. In other embodiments, process 800 or portions of process 800 of FIG. 8 may be implemented by and/or executed on a plurality of network devices, such as RCSD 112 and MSD 114 of FIG. 1. In yet other embodiments, process 800 or portions of process 800 of FIG. 8 may be implemented by and/or executed on a client device, such as client device 200 of FIG. 2.

Process 800 begins, after a start block, at block 802, where preceding word(s) within the incomplete response message (RM) are identified. The details of the identification of the preceding word(s) are discussed above in conjunction with block 406 of FIG. 4.

At block 804, at least one candidate next word for the incomplete response message is determined based on the RCM, the received stimulus message, and the incomplete response message. In some embodiments, a ranked list of candidate next word for the incomplete response message are determined based on the trained RCM, the stimulus message, and identified preceding word within the incomplete response message. The details regarding the determination of the list and ranking of the candidate next word are described above in conjunction with block 406 of FIG. 4 and below in conjunction with FIGS. 9 and 10.

In any event, process 800 next proceeds to decision block 806, where a user may select at least one word from the at least one determined candidate words. In some embodiments, a user may select at least one word from the determined list of candidate next word. In some embodiments, the selected at least one word is selected by the user that is composing the incomplete response message. If the user does not select a candidate word(s), the process flows to block 810. In block 810, the next word in the incomplete response message is received. In sortie embodiments, the next word is received by the user that is composing that incomplete response message. The user provides the next word by typing the complete word. The received next word may or may not complete the response message. Process 800 then flows to decision block 812.

If at least one word is selected at decision block 806, process 800 next flows to block 808, wherein the at least one selected word is included within the incomplete response message. In some embodiments, the at least one selected word is inserted within the incomplete response message. The selected at least one word may be inserted as the next word in the incomplete response message. In some embodiments, the selected at least one word is selected by the user composing the incomplete response message. In other embodiments, the selected at least one word is selected automatically. The included word may or may not complete the response message.

Process 800 next proceeds to decision block 812, where a determination is made if the response message is complete. If the response message is not complete, process 800 loops back to block 802. If the response message is complete, process 800 proceeds to block 814, wherein the RCM may be updated based on the received stimulus message and completed response message. In some embodiments, the received stimulus message and the complete response message are employed to further determine the RCM. The received stimulus message and the completed response message are archived. In some embodiments, the received stimulus message and the completed response message may be added to user profile data. The received stimulus and complete response message may be used to further determine the RCM. The determination of the RCM may be customized to specific users, including at least the stimulus message sender and the composer of the response message.

Figure 9:
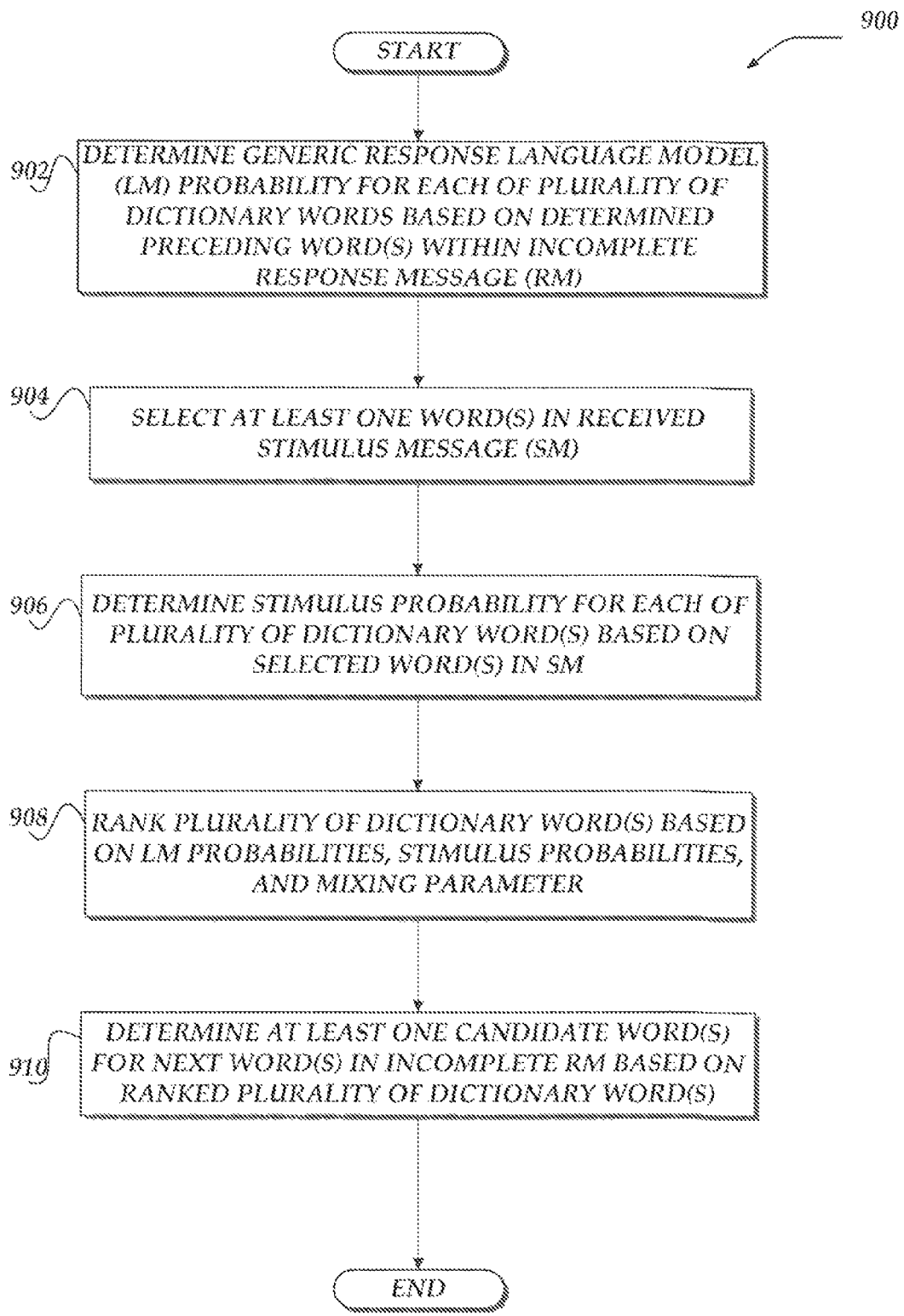
FIG. 9 illustrates a logical flow diagram generally showing one embodiment of an overview process for determining a list of candidate next word(s) with a Response Completion Model including a Stimulus Model based on a "Selection Model"

FIG. 9 illustrates a logical flow diagram generally showing one embodiment of an overview process for determining a list of candidate next word(s) with a' Response Completion Model including a Stimulus Model based on a "Selection Model." In some embodiments, process 900 of FIG. 9 may be implemented by and/or executed on a single network device, such as network device 300 of FIG. 3. In other embodiments, process 900 or portions of process 900 of FIG. 9 may be implemented by and/or executed on a plurality of network devices, such as RCSD 112 or MSD 114 of FIG. 1. In yet other embodiments, process 900 or portions of process 900 of FIG. 9 may be implemented by and/or executed on a client device, such as client device 200 of FIG. 2.

Process 900 begins, after a start block, at 902, where at least one LM Probability, $P(r_{i+1}|r_1 \ldots _i)$, for each of a plurality of words in a dictionary is determined based on at least the at least one determined preceding word within the incomplete response message. In some embodiments, the LM Probabilities are determined from an N-gram model, where N can take on any integer positive value. In some embodiments, a trigram model is used. In some embodiments, a bigram model is used. In some embodiments, a unigram model is used. In some embodiments, back-off is used. In some embodiments, the LM Probabilities are determined with equation (1). In some embodiments, the LM Probabilities are determined with equation (2).

In some embodiments, an LM Probability is determined for each word in the identified dictionary. In other embodiments, an LM Probability is calculated for each of a subset of the words in the identified dictionary. In some embodiments, if the incomplete response message is absent any word, the LM Probabilities are all determined to be equal. In some embodiments, if the incomplete response message is absent any word, the LM Probabilities are all determined to be equal to 0.0. In some embodiments, if the last word in the incomplete response message is only partially types, then the LM Probabilities may be based on the partially typed last word. A list of words may be determined based on the LM Probabilities.

Process 900 continues to block 904, where at least one word in the received stimulus message is selected. In some embodiments, every word in the received stimulus message is selected. In some embodiments, the selection is done in conjunction with the LM and a proper mixture parameter.

At block 906, at least one Stimulus Probability, $P(r_{i+1}|s)$, for each of a plurality of dictionary words is determined based on the selected at least one word in the stimulus message. In some embodiments, the plurality of words for which a Stimulus Probability is determined is the same plurality of words for which a LM Probability is determined in block 902. In some embodiments, the Stimulus Probability for a word, $r_{i+1}$ is determined from equation (4). In some embodiments, the Stimulus Probability is determined to be equal to 1.0 if the word, $r_{i+1}$, is included in the selected at least one word in the received stimulus message.

Process 900 next proceeds to block 908, where a plurality of dictionary words is ranked based at least on the at least one LM Probability, at least one determined Stimulus Probability, and the mixing parameter. In some embodiments, the plurality of dictionary words is ranked based on the RCM and Completion Probabilities, which may be determined with equation (1). In some embodiments, if the incomplete message is absent any word, the plurality of dictionary words is ranked based on at least one determined Stimulus Probability.

Process 900 next proceeds to block 910, where at least one candidate word for next word in the incomplete response message is determined based on the ranked plurality of dictionary words. In some embodiments, a list of candidate words for next words in the incomplete response message is determined based on the ranked plurality of dictionary words. In some embodiments, the list of candidate words for next words in the incomplete response message is ordered, where the ordering is determined based on at least the ranked plurality of dictionary words. In some embodiments, the list of candidate words, includes all the words within the dictionary. In some embodiments, the list of candidate words includes a subset the word within the dictionary.

Figure 10:
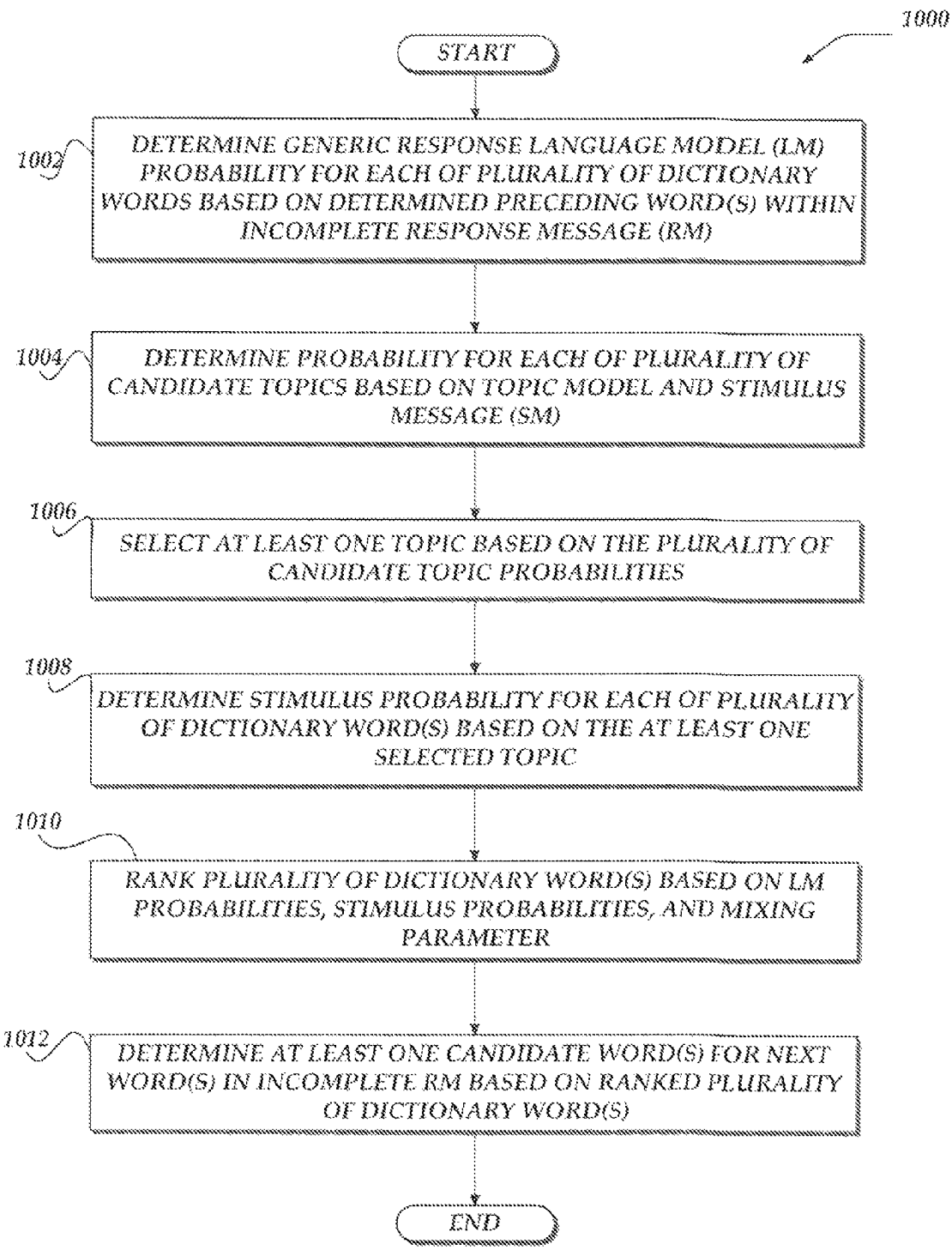
FIG. 10 illustrates a logical flow diagram generally showing one embodiment of an overview process for determining a list of candidate next word(s) with a Response Completion Model including a Stimulus Model based on a "Topic Model"

FIG. 10 illustrates a logical flow diagram generally showing one embodiment of an overview process for determining a list of candidate next word(s) with a Response Completion Model including a Stimulus Model based on a "Topic Model." In some embodiments, process 1000 of FIG. 10 may be implemented by and/or executed on a single network device, such as network device 300 of FIG. 3. In other embodiments, process 1000 or portions of process 1000 of FIG. 10 may be implemented by and/or executed on a plurality of network devices, such as the RCSD 112 and the MSD 114 of FIG. 1. In yet other embodiments, process 1000 or portions of process 1000 of FIG. 10 may be implemented by and/or executed on a client device, such as client device 200 of FIG. 2.

Process 1000 begins, after a start block, at 1002, where at least one LM Probability for each of a plurality of words in a dictionary is determined based on at least one determined preceding word within the incomplete response message. The details of which are described above in conjunction with block 902 of FIG. 9.

Process 1000 continues to block 1004, where a Topic Probability for each of a plurality of candidate topics is determined based on the Topic Model and the stimulus message. In some embodiments, the plurality of candidate topics is ranked based on the determined probabilities.

Process 1006 continues to block 1006, where at least one topic is selected based on the determined plurality of candidate Topic Probabilities. In some embodiments, the selected topic is the highest ranked topic. In some embodiments, each of the plurality of topics may be selected.

At block 1008, at least one Stimulus Probability, $P(r_{i+1}|s)$, for each of a plurality of dictionary words is determined based on the at least one selected topic. In some embodiments, the plurality of words for which a Stimulus Probability is determined is the same plurality of words for which a LM Probability is determined in block 1002. In some embodiments, the Stimulus Probability for a word, $r_{i+1}$ is determined from equation (5), where t* is the selected topic. In some embodiments where multiple topics are selected, Topic Probabilities may be summed in the analysis. In some embodiments, noise filtering or smoothing techniques may be used when determining the Stimulus Probability for each of the plurality of dictionary word.

Process 1000 next proceeds to block 1010, where a each of the plurality of dictionary words is ranked based at least on the at least one LM Probability, the at least one determined Stimulus Probability, and the mixing parameter. In some embodiments, the ranking is based on Completion Probabilities, which are determined with equation (1). In some embodiments, the mixture parameter, $\lambda_s$ is adjusted based on $P(t^*|s)$, from equation (5) or the topic parameter, $\lambda_{topic}$. In some embodiments, the mixing parameter may be set to $\lambda_s = \lambda_{topic} * P(t^*|s)$.

Process 1000 next proceeds to block 1012, where at least one candidate word for next word in the incomplete response message is determined based on the ranked plurality of dictionary words. The details in determining the at least one word are describe above in conjunction with block 910 of FIG. 9.

In contrast to a mixture model, some embodiments may include a Translation Model. In embodiments including a Translation Model, the received stimulus message is considered as the source language. A noisy channel model from used in statistical machine translation may be considered: $P(r|s) \propto P(r)*P(s|r)$. In order to predict $r_{i+1}$, given and s, for each candidate $r_{i+1}$, in principle one can marginalize over all candidate completions of and rank candidate $r_{i+1}$. Let P(n) be the distribution of response length, let r' be a possible completion of a response whose first i+1 words match $r_{1 \ldots i+1}$). For each possible n>1, we need to marginalize over all possible r' on length n, and rank $r_{i+1}$ according to $$P(r_{1 \ldots i+1} | s) = \sum_{n>i} P(n) * \sum_{|r'|=n} P(r' | s).$$

In some embodiments, a greedy approach is used. For such embodiments, choose a $r_{i+1}$ which yields the optimal partial response (without looking ahead):

$$P(r_{1 \ldots i+1}|s) \propto P(r_{1 \ldots i+1})*P(s|r_{1 \ldots i+1})$$

Which is equivalent to ranking candidate $r_{i+1}$ by $$P(r_{i+1}|r_{1 \ldots i})*P(s|r_{1 \ldots i+1}) \quad (6)$$

The first component in equation (6) is the LM found in other embodiments. However, the second component is a Translation Model. The Translation Model may be determined based on the received stimulus-response message data. Some embodiments may determine a translation table. Equal number of next candidate words may be determined and ranked by equation (6).

The above specification, examples, and data provide a complete description of the composition, manufacture, and use of the invention. Since many embodiments of the invention can be made without departing from the spirit and scope of the invention, the invention resides in the claims hereinafter appended.

What is claimed is:

1. A method for providing response message completion, comprising:
   determining a response completion model (RCM) using a linear combination of a generic response language model (LM) and a stimulus model with a mixing parameter for a mixing model, the mixing parameter being based, at least in part, on a topic probability, the topic probability to be assigned a value based, at least in part, on a likelihood that a candidate topic is associated with a received stimulus message;
   receiving a stimulus message (SM);
   if an incomplete response message includes at least one preceding word, determining at least one candidate next word for the incomplete response message based, at least in part, on the RCM, the SM, and the at least one preceding word and based, at least in part, on estimated word frequencies in stimulus messages from a plurality of stimulus-response message pairs;
   selecting at least one word from the at least one determined candidate next word;
   including the selected at least one word within the incomplete response message; and
   generating a complete response message that is based, at least in part, on the incomplete response message that includes the selected at least one word.

2. The method of claim 1, further comprising if the incomplete response message is absent one or more words, determining the at least one candidate next word for the incomplete response message based, at least in part, on at least the RCM and the SM.

3. The method of claim 1, wherein determining the RCM further comprises:
   receiving stimulus-response parameters including at least a plurality of stimulus-response message pairs;
   determining a dictionary containing a plurality of words;
   determining the LM based, at least in part, on the dictionary and the stimulus-response parameters;
   determining the stimulus model based, at least in part, on the dictionary and the stimulus response parameters;
   determining the mixing parameter for the mixing model based, at least in part, on at least the stimulus-response parameters; and
   determining the RCM based, at least in part, on the LM, the stimulus model, and the mixing parameter.

4. The method of claim 1, wherein determining the RCM is based, at least in part, on a selection model and further comprises:
   determining an estimated overall frequency of one or more words in at least one stimulus message from a plurality of stimulus-response message pairs that are also included in corresponding response message from the plurality of stimulus-response message pairs, wherein the plurality of stimulus-response message pairs are included in received stimulus-response parameters; wherein
   the mixing parameter for the mixing model is additionally based, at least in part, on the estimated overall frequency of one or more words in the at least one stimulus message.

5. The method of claim 1, wherein determining the RCM is based, at least in part, on a topic model and further comprises:
   determining the topic model based, at least in part on received stimulus-response parameters;
   determining the mixing parameter for the mixing model based, at least in part, on at least the determined topic model; and
   determining the RCM based, at least in part, on at least the determined topic model, LM, and the mixing parameter.

6. The method of claim 1, wherein determining at least one candidate next word, further comprises:
   determining at least one LM probability for a plurality of words in a dictionary based, at least in part, on at least the at least one determined preceding word within the incomplete response message;
   selecting at least one word in the stimulus message;
   determining at least one stimulus probability for the plurality of dictionary words based, at least in part, on the selected at least one word in the stimulus message;
   ranking the plurality of dictionary words based, at least in part, at least on the at least one LM probability, the at least one determined stimulus probability, and the mixing parameter; and
   determining at least one candidate word in the incomplete response message based, at least in part, on the ranked plurality of dictionary words.

7. The method of claim 1, wherein determining at least one candidate next word further comprises:

determining at least one LM probability for a plurality of words in a dictionary based, at least in part, on the at least one determined preceding word within the incomplete response message;

determining the topic probability for a plurality of candidate topics based, at least in part, on a topic model and the SM;

selecting at least one topic based, at least in part, on the determined plurality of candidate topic probabilities;

determining at least one stimulus probability for the plurality of dictionary word based, at least in part on the selected at least one topic;

ranking the plurality of dictionary words based, at least in part on the at least one LM probability, the at least one determined stimulus probability, and the mixing parameter; and determining the at least one candidate word for the incomplete response message based, at least in part, on the ranked plurality of dictionary words.

8. The method of claim 1, wherein determining the mixing parameter of the mixing model further comprises:
determining a topic parameter based, at least in part, on a subset of received stimulus-response parameters; and
determining the mixing parameter of the mixing model based, at least in part, on the determined topic parameter.

9. The method of claim 1, further comprising:
determining a most likely topic probability based, at least in part, on use of the function t* =argmax$_t$/(topic=t|s), wherein t* corresponds to a most likely topic, wherein t corresponds to a candidate topic, and wherein s corresponds to a received stimulus message.

10. A system to provide response message completion, comprising:
at least one network device, comprising:
a memory to store parameters and instructions:
a processor to execute instructions to:
determine a response completion model (RCM) via a linear combination of a generic response language model (LM) and a stimulus model with a mixing parameter for a mixing model, the mixing parameter to be based, at least in part, on a topic probability, the topic probability to be assigned a value to be based, at least in part, on a likelihood that a candidate topic is to be associated with a received stimulus message;
receive a stimulus message (SM);
if an incomplete response message is to include at least one preceding word, determine at least one candidate next word for the incomplete response message to be based, at least in part, on the RCM, the SM, and the at least one preceding word, and to be based, at least in part, on estimated word frequencies in stimulus messages from a plurality of stimulus-response message pairs;
select at least one word from the at least one determined candidate next word;
include the selected at least one word within the incomplete response message; and
generate a complete response message that is to be based, at least in part on the incomplete response message to include the selected at least one word.

11. The system of claim 10, wherein the processor is additionally to:
if the incomplete response message is to be absent one or more words, determine the at least one candidate next word for the incomplete response message to be based, at least in part, on at least the RCM and the SM.

12. The system of claim 10, wherein to determine the RCM is to further comprise:
to receive stimulus-response parameters to include at least a plurality of stimulus-response message pairs;
to determine a dictionary to comprise a plurality of words;
to determine the LM to be based, at least in part, on the dictionary and the stimulus-response parameters;
to determine the stimulus model to be based, at least in part, at least on the dictionary and the stimulus response parameters;
to determine the mixing parameter to be based, at least in part, on at least the stimulus-response parameters; and
to determine the RCM to be based, at least in part, at least on the LM, the stimulus model, and the mixing parameter.

13. The system of claim 10, wherein to determine the RCM is to be based, at least in part, on a selection model and is to further comprise:
to determine an estimated overall frequency of one or more words in at least one stimulus message from a plurality of stimulus-response message pairs that are to be also included in a corresponding response message from the plurality of stimulus-response message pairs, wherein the plurality of stimulus-response message pairs to be included in received stimulus-response parameters; wherein
the mixing parameter to be additionally based, at least in part, on the estimated overall frequency of one or more words in the at least one stimulus message.

14. The system of claim 10, wherein to determine the RCM is to be based, at least in part, on a topic model and is to further comprise:
to determine the topic model to be based, at least in part on received stimulus-response parameters;
to determine the mixing parameter to be based, at least in part, on at least the determined topic model; and
to determine the RCM to be based, at least in part, on at least the determined topic model, LM, and the mixing parameter.

15. The system of claim 10, wherein to determine at least one candidate next word, is to further comprise:
to determine at least one LM probability for a plurality of words in a dictionary to be based, at least in part, on at least the at least one determined preceding word within the incomplete response message;
to select at least one word in the stimulus message;
to determine at least one stimulus probability for the plurality of dictionary words to be based, at least in part, on the selected at least one word in the stimulus message;
to rank the plurality of dictionary words to be based, at least in part, at least on the at least one LM probability, the at least one determined stimulus probability, and the mixing parameter; and
to determine at the least one candidate word in the incomplete response message to be based, at least in part, on the ranked plurality of dictionary words.

16. The system of claim 10, wherein to determine at least one candidate next word, is to further comprise:
to determine at least one LM probability for a plurality of words in a dictionary to be based, at least in part, on at least the at least one determined preceding word within the incomplete response message;
to determine the topic probability for a plurality of candidate topics to be based, at least in part, on a topic model and the SM;
to select at least one topic to be based, at least in part, on the determined plurality of candidate topic probabilities;

to determine at least one stimulus probability for the plurality of dictionary words to be based, at least in part, at least on the selected at least one topic;

to rank the plurality of dictionary words to be based, at least in part, at least on the at least one LM probability, the at least one determined stimulus probability, and the mixing parameter; and to determine at least one candidate word for next word in the incomplete response message to be based, at least in part, on the ranked plurality of dictionary words.

17. The system of claim 10, wherein to determine the mixing parameter is to further comprise:

to determine a topic parameter to be based, at least in part, on a subset of received stimulus-response parameters; and to determine the mixing parameter to be based, at least in part, at least on the determined topic parameter.

18. The system of claim 10, wherein the processor is additionally to:

determine a most likely topic probability to be based, at least in part, on the function $t^* = \mathrm{argmax}_t(\mathrm{topic}=t|s)$, wherein $t^*$ is to correspond to a most likely topic, wherein t is to correspond to a candidate topic, and wherein s is to correspond to a received stimulus message.

19. An article comprising:

a non-transitory storage medium comprising processor-readable instructions stored thereon which are executable by a special purpose computing apparatus to:

determine a response completion model (RCM) via a linear combination of a generic response language model (LM) and a stimulus model with a mixing parameter for a mixing model, the mixing model to be based, at least in part, on a topic probability, the topic probability to be assigned a value to be based, at least in part, on a likelihood that a candidate topic is to be associated with a received stimulus message;

receive a stimulus message (SM);

if an incomplete response message is to include at least one preceding word, to determine at least one candidate next word for the incomplete response message to be based, at least in part, on the RCM, the SM, and the at least one preceding word, and to be based, at least in part, on estimated word frequencies in stimulus messages from a plurality of stimulus-response message pairs;

select at least one word from the at least one determined candidate next word;

include the selected at least one word within the incomplete response message; and generate a complete response message to be based, at least in part on the incomplete response message to include the selected at least one word.

20. The article of claim 19, wherein the non-transitory storage medium additionally comprises processor-readable instructions stored thereon which are executable by the special purpose computing apparatus to:

determine, if the incomplete response message is to be absent one or more words, the at least one candidate next-word for the incomplete response message to be based, at least in part, on at least the RCM and the SM.

21. The article of claim 19, wherein the non-transitory storage medium additionally comprises processor-readable instructions stored thereon which are executable by the special purpose computing apparatus to:

receive stimulus-response parameters to include at least a plurality of stimulus-response message pairs;

determine a dictionary to comprise a plurality of words;

determine the LM to be based, at least in part, on the dictionary and the stimulus-response parameters;

determine the stimulus model to be based, at least in part, on the dictionary and the stimulus-response parameters;

determine the mixing parameter to be based, at least in part, on the stimulus-response parameters; and determine the RCM to be based, at least in part, on the LM, the stimulus model, and the mixing parameter.

22. The article of claim 19, wherein the non-transitory storage medium additionally comprises processor-readable instructions stored thereon which are executable by the special purpose computing apparatus to:

determine an estimated overall frequency of one or more words in at least one stimulus message from a plurality of stimulus-response message pairs that are also to be included in corresponding response messages from the plurality of stimulus-response message pairs, wherein the plurality of stimulus-response message pairs are to be included in received stimulus-response parameters; wherein the mixing parameter to be additionally based, at least in part, on the estimated overall frequency of one or more words in the at least one stimulus message.

23. The article of claim 19, wherein the non-transitory storage medium additionally comprises processor-readable instructions stored thereon which are executable by the special purpose computing apparatus to:

determine the topic model to be based, at least in part on received stimulus-response parameters;

determine the mixing parameter to be based, at least in part, on the determined topic model; and determine the RCM to be based, at least in part, on the determined topic model, LM, and the mixing parameter.

24. The article of claim 19, wherein the non-transitory storage medium additionally comprises processor-readable instructions stored thereon which are executable by the special purpose computing apparatus to:

determine at least one LM probability for a plurality of words in a dictionary to be based, at least in part, on the at least one determined preceding word within the incomplete response message;

select at least one word in the stimulus message;

determine at least one stimulus probability for the plurality of dictionary words to be based, at least in part, on the selected at least one word in the stimulus message;

rank the plurality of dictionary words to be based, at least in part, on the at least one LM probability, the at least one determined stimulus probability, and the mixing parameter; and determine at least one candidate word for next word in the incomplete response message to be based, at least in part, on the ranked plurality of dictionary words.

25. The article of claim 19, wherein the non-transitory storage medium additionally comprises processor-readable instructions stored thereon which are executable by the special purpose computing apparatus to:

determine at least one LM probability for a plurality of words in a dictionary to be based, at least in part, on the at least one determined preceding word within the incomplete response message;

determine a topic probability for a plurality of candidate topics to be based, at least in part, on a topic model and the SM;

select at least one topic to be based, at least in part, on the determined plurality of candidate topic probabilities;

determine at least one stimulus probability for the plurality of dictionary word to be based, at least in part, on the selected at least one topic;

rank the plurality of dictionary words to be based, at least in part, on the at least one LM probability, the at least one determined stimulus probability, and the mixing parameter; and determine at least one candidate word for next word in the incomplete response message to be based, at least in part, on the ranked plurality of dictionary words.

26. The article of claim 19, wherein the non-transitory storage medium additionally comprises processor-readable instructions stored thereon which are executable by the special purpose computing apparatus to:

determine a topic parameter to be based, at least in part, on a subset of received stimulus-response parameters; and determine the mixing parameter to be based, at least in part, on the determined topic parameter.

27. The article of claim 19, wherein the non-transitory storage medium additionally comprises processor-readable instructions stored thereon which are executable by the special purpose computing apparatus to:

determine a most likely topic probability to be based, at least in part, on the function $t^* = \mathrm{argmax}_t(\mathrm{topic}=t|s)$, wherein $t^*$ is to correspond to a most likely topic, wherein t is to correspond to a candidate topic, and wherein s is to correspond to a received stimulus message.

* * * * *